United States Patent
Okuma

(10) Patent No.: US 10,835,991 B2
(45) Date of Patent: Nov. 17, 2020

(54) LASER BEAM IRRADIATING DEVICE

(71) Applicant: HAMAMATSU PHOTONICS K.K., Hamamatsu (JP)

(72) Inventor: Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 292 days.

(21) Appl. No.: 16/073,478

(22) PCT Filed: Jan. 24, 2017

(86) PCT No.: PCT/JP2017/002347
§ 371 (c)(1),
(2) Date: Jul. 27, 2018

(87) PCT Pub. No.: WO2017/130961
PCT Pub. Date: Aug. 3, 2017

(65) Prior Publication Data
US 2019/0039174 A1    Feb. 7, 2019

(30) Foreign Application Priority Data
Jan. 28, 2016   (JP) ................. 2016-014510

(51) Int. Cl.
| B23K 26/06 | (2014.01) |
| B23K 26/53 | (2014.01) |
| B23K 26/064 | (2014.01) |
| B23K 26/0622 | (2014.01) |
| B23K 26/38 | (2014.01) |
| B23K 103/00 | (2006.01) |

(52) U.S. Cl.
CPC ........ B23K 26/064 (2015.10); B23K 26/0622 (2015.10); B23K 26/38 (2013.01);
(Continued)

(58) Field of Classification Search
CPC .. B23K 26/064; B23K 26/0622; B23K 26/53; B23K 26/38; B23K 26/50; B23K 26/56; B23K 26/54
See application file for complete search history.

(56) References Cited

U.S. PATENT DOCUMENTS

| 10,324,285 B2 * | 6/2019 | Ito ................. B23K 26/032 |
| 2009/0004763 A1 * | 1/2009 | Ono ................. B23K 26/048 |
| | | 438/7 |

(Continued)

FOREIGN PATENT DOCUMENTS

| CN | 100442106 C | 12/2008 |
| CN | 103907048 A | 7/2014 |

(Continued)

OTHER PUBLICATIONS

International Preliminary Report on Patentability dated Aug. 9, 2018 for PCT/JP2017/002347.

*Primary Examiner* — Brian W Jennison
(74) *Attorney, Agent, or Firm* — Faegre Drinker Biddle & Reath LLP

(57) ABSTRACT

A laser light irradiation device includes a laser light source, a spatial light modulator, a controller, an objective lens, and an intensity distribution acquisition unit. The laser light source generates laser light. The spatial light modulator includes a display unit configured to display a phase pattern, allows the laser light to enter the display unit, and modulates the laser light in accordance with the phase pattern to emit the laser light. The controller controls the phase pattern to be displayed. The objective lens converges the laser light emitted from the spatial light modulator at the object. The intensity distribution acquisition unit acquires an intensity distribution of the laser light emitted from the spatial light modulator and entering the objective lens. The controller displays, on the display unit, the phase pattern including a (Continued)

marking configured to modulate part, in the laser light, not entering a pupil plane of the objective lens.

19 Claims, 25 Drawing Sheets

(52) U.S. Cl.
CPC .......... *B23K 26/53* (2015.10); *B23K 2103/50* (2018.08); *B23K 2103/54* (2018.08); *B23K 2103/56* (2018.08)

(56) References Cited

U.S. PATENT DOCUMENTS

| | | | |
|---|---|---|---|
| 2009/0017642 A1* | 1/2009 | Takami | B23K 26/04 438/795 |
| 2009/0086325 A1* | 4/2009 | Liu | H01L 51/5246 359/599 |
| 2010/0059490 A1* | 3/2010 | Unrath | B23K 26/066 219/121.73 |
| 2012/0206786 A1* | 8/2012 | Ito | G02B 19/0014 359/238 |

FOREIGN PATENT DOCUMENTS

| | | |
|---|---|---|
| CN | 105264429 A | 1/2016 |
| JP | 3878758 B2 | 2/2007 |
| JP | 201131284 A | 2/2011 |
| JP | 2011-051011 A | 3/2011 |
| JP | 2012-501853 A | 1/2012 |
| JP | 2012-168333 A | 9/2012 |
| JP | 2013-132651 A | 7/2013 |
| WO | WO-2009/136189 A1 | 11/2009 |
| WO | WO-2010/030575 A2 | 3/2010 |
| WO | WO-2014-156687 A1 | 10/2014 |

* cited by examiner

*Fig.17*
(a) 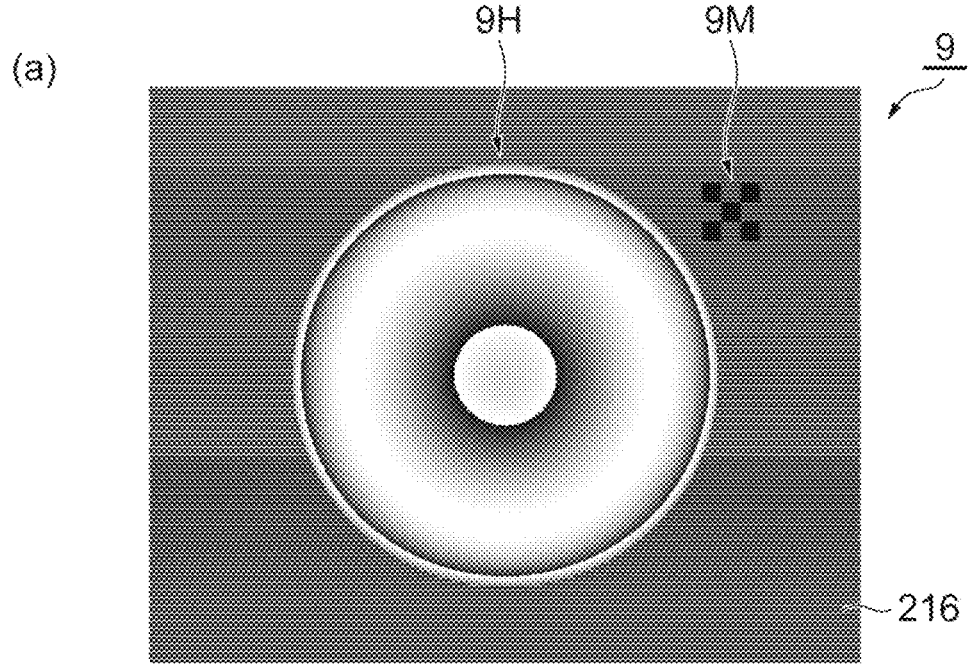
(b) 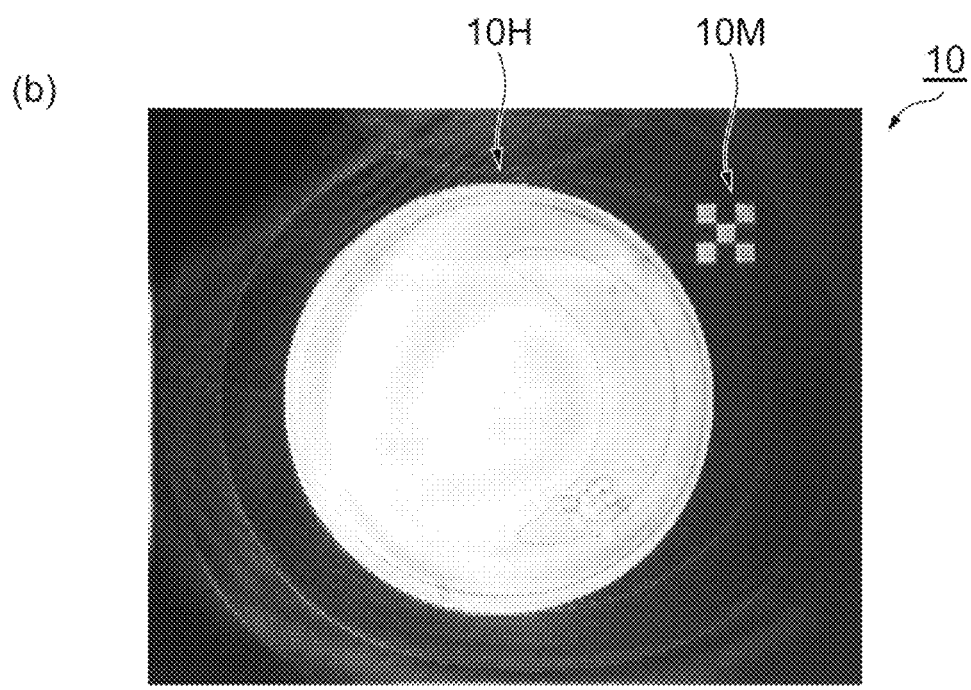

*Fig.20*
(a)
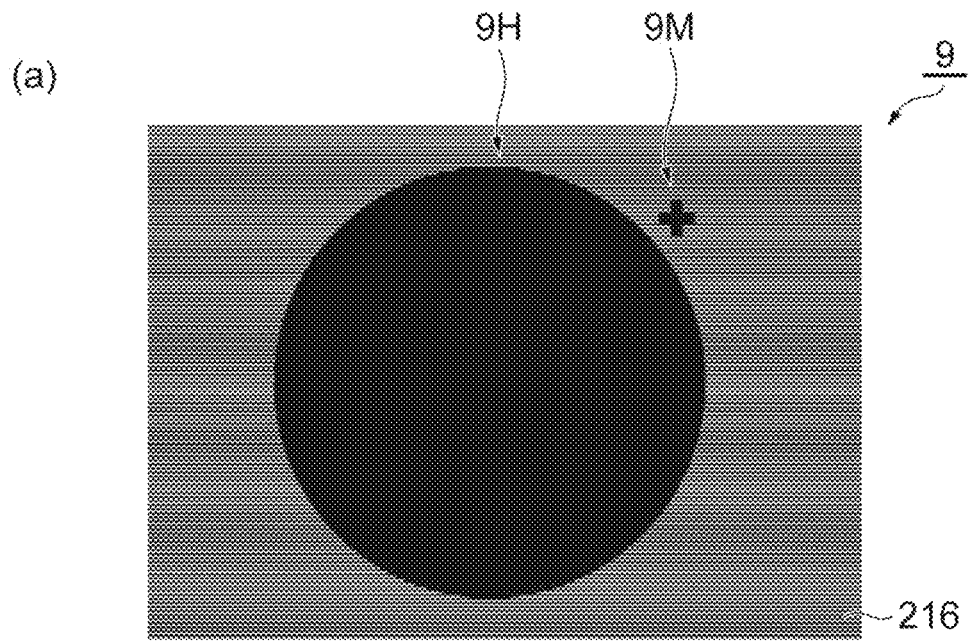
(b)
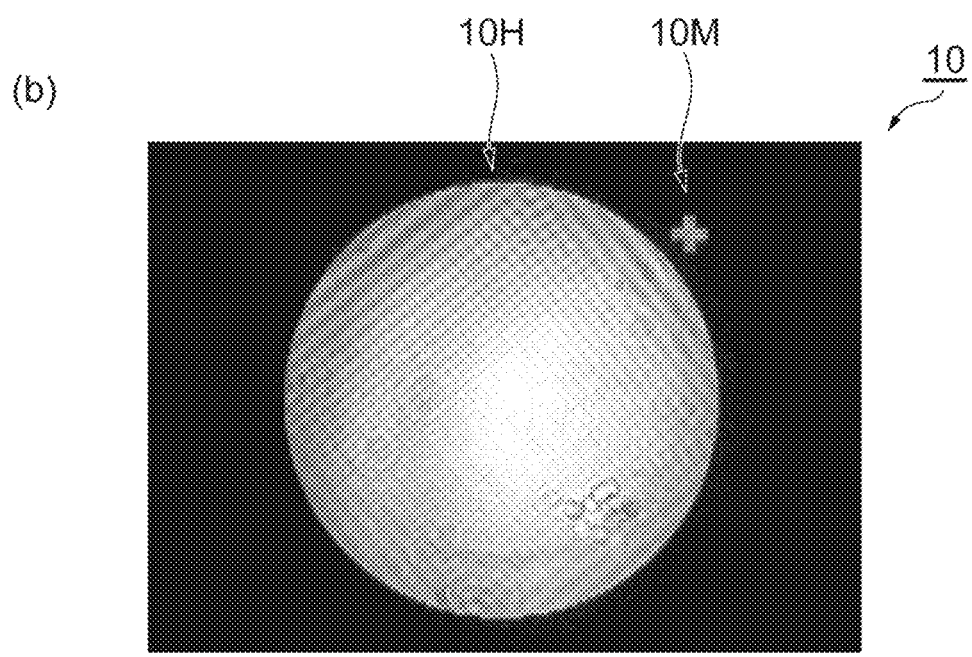

Fig.21
(a)
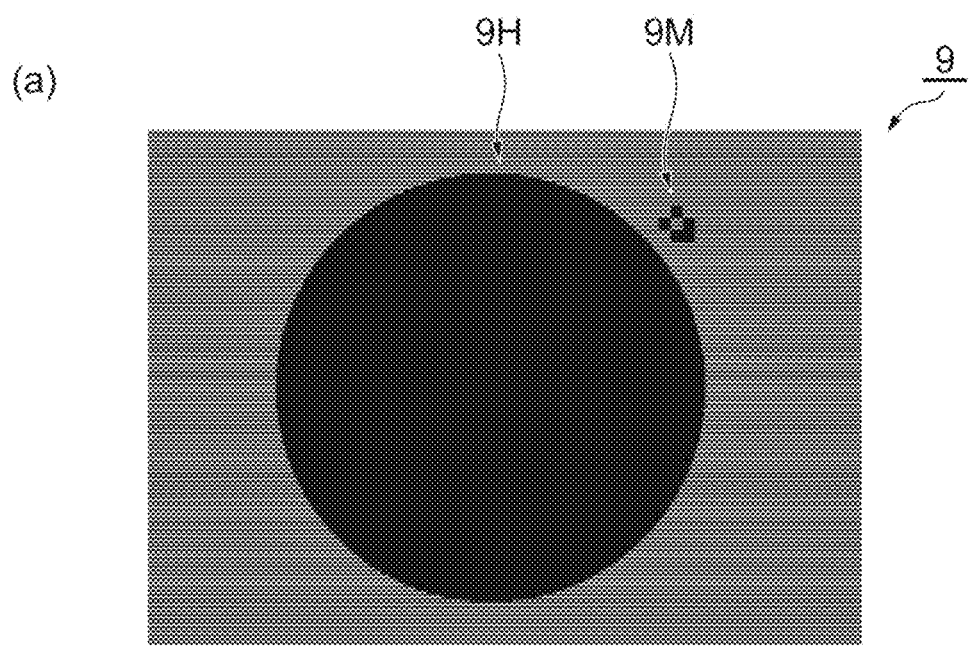
(b)
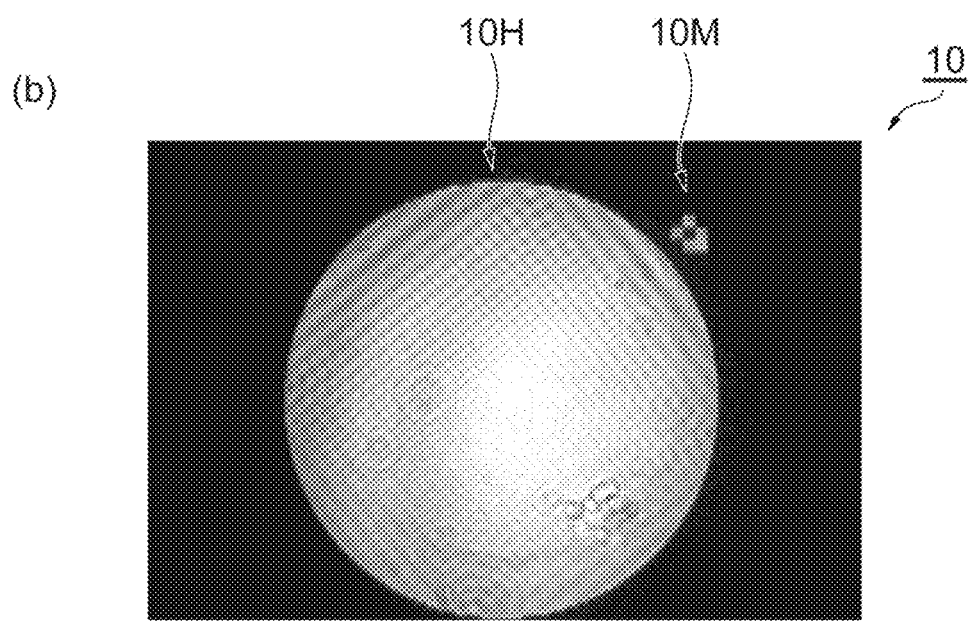

LASER BEAM IRRADIATING DEVICE

TECHNICAL FIELD

One aspect of the present invention relates to a laser light irradiation device.

BACKGROUND ART

Conventionally, as a laser light irradiation device configured to emit laser light to an object, a device described in Patent Literature 1 is described, for example. In such a laser light irradiation device, laser light generated by a laser light source is modulated by a spatial light modulator and then converged at an object by an objective lens.

CITATION LIST

Patent Literature

Patent Literature 1: Japanese Unexamined Patent Publication No. 2011-51011

SUMMARY OF INVENTION

Technical Problem

In the laser light irradiation device as described above, during emission of the laser light to the object, there is a case where the spatial light modulator does not normally operate due to a defect or abnormality of the spatial light modulator, and the emission of the laser light cannot be performed normally.

In view of the above, an object of one aspect of the present invention is to provide a laser light irradiation device enabled to accurately confirm normal operation of the spatial light modulator during emission of the laser light.

Solution to Problem

A laser light irradiation device according to one aspect of the present invention is a laser light irradiation device configured to emit laser light to an object, and includes: a laser light source configured to generate the laser light; a spatial light modulator including a display unit configured to display a phase pattern, the spatial light modulator allowing the laser light generated by the laser light source to enter the display unit and modulating the laser light in accordance with the phase pattern to emit the laser light from the display unit; a controller configured to control at least the phase pattern to be displayed on the display unit; an objective lens configured to converge the laser light emitted from the spatial light modulator at the object; and an intensity distribution acquisition unit configured to acquire an intensity distribution of the laser light emitted from the spatial light modulator and entering the objective lens, in which the controller displays, on the display unit, the phase pattern including a marking configured to modulate part, in the laser light, not entering a pupil plane of the objective lens.

In the laser light irradiation device, the part, in the laser light, not entering the pupil plane of the objective lens (for example, part to be cut by an aperture of the objective lens) is modulated by the marking displayed on the display unit. Thus, while emitting the laser light to the object, without affecting the laser light irradiation, it is possible to confirm whether or not display of the display unit is normally controlled, by confirming whether or not intensity modulation by the marking appears in the intensity distribution acquired by the intensity distribution acquisition unit. Therefore, it is possible to accurately confirm the normal operation of the spatial light modulator during emission of the laser light.

In the laser light irradiation device according to one aspect of the present invention, the marking may be located in a region from which the part of the laser light not entering the pupil plane of the objective lens is emitted, in a region on which the laser light strikes in the display unit. By locating the marking in this way, it is possible to specifically implement modulation of the part of the laser light not entering the pupil plane of the objective lens.

In the laser light irradiation device according to one aspect of the present invention, the intensity distribution acquisition unit may be a camera configured to acquire an image of the intensity distribution of the laser light. With this configuration, it is possible to recognize the intensity distribution of the laser light with the image acquired by the camera.

In the laser light irradiation device according to one aspect of the present invention, the controller may vary shutter time of the intensity distribution acquisition unit in accordance with magnitude of an output of the laser light generated by the laser light source. Since an amount of light on the camera changes depending on the output of the laser light, by varying the shutter time in accordance with the magnitude of the output of the laser light, it is possible to keep a constant level of a luminance value of the image to be acquired and secure the quality of the image.

The laser light irradiation device according to one aspect of the present invention may further include a determination unit configured to determine whether or not the spatial light modulator has normally operated on the basis of the marking to be displayed on the display unit by the controller and the intensity distribution acquired by the intensity distribution acquisition unit. With this configuration, it is possible to confirm the normal operation of the spatial light modulator from a determination result of the determination unit.

In the laser light irradiation device according to one aspect of the present invention, a focusing lens configured to focus the laser light may be arranged between the spatial light modulator and the intensity distribution acquisition unit in an optical path of the laser light, and a slit member configured to shield a spatial frequency component of greater than or equal to a constant value in the laser light may be arranged at a focal position of the focusing lens or near the focal position. In this case, it is possible to inhibit that the spatial frequency component of greater than or equal to the constant value of the laser light is not shielded and is acquired by the intensity distribution acquisition unit. As a result, it is possible to inhibit that recognition of the intensity modulation by the marking is degraded due to the spatial frequency component of greater than or equal to the constant value, in the intensity distribution of the laser light acquired by the intensity distribution acquisition unit.

The laser light irradiation device according to one aspect of the present invention may be the laser light irradiation device configured to emit the laser light to the object along a plurality of irradiation schedule lines, and include a moving mechanism configured to relatively move the laser light along the irradiation schedule lines with respect to the object, and in the controller, the output of the laser light and the phase pattern including a body pattern and the marking corresponding to the body pattern are set for each laser light irradiation does along one or the plurality of irradiation schedule lines, the controller executes laser light irradiation control in which while the phase pattern set is displayed on the display unit, the laser light is emitted to the object with the output set, and the laser light is relatively moved by the moving mechanism along each of the plurality of irradiation schedule lines, the intensity distribution acquisition unit acquires the intensity distribution of the laser light during execution of the laser light irradiation control by the controller. In this case, it is possible to specifically implement accurate confirmation about the normal operation of the spatial light modulator during emission of the laser light.

In the laser light irradiation device according to one aspect of the present invention, the marking may be a pattern including at least one of a phase region of a spatial frequency component of greater than or equal to a constant value and a phase region of a spatial frequency component of less than the constant value. In this case, the intensity modulation by the marking can be easily recognized in the intensity distribution of the laser light acquired by the intensity distribution acquisition unit.

In the laser light irradiation device according to one aspect of the present invention, a modified region may be formed by setting a converging point within the object and emitting the laser light to the object. In this case, laser processing within the object can be performed.

Advantageous Effects of Invention

According to one aspect of the present invention, a laser light irradiation device can be provided enabled to accurately confirm the normal operation of the spatial light modulator during emission of the laser light.

BRIEF DESCRIPTION OF DRAWINGS

FIG. 17($a$), ($a$) is a diagram illustrating an example of a phase pattern displayed on a liquid crystal layer. FIG. 17($b$) is a diagram illustrating an example of an intensity distribution image captured by a profile acquisition camera.

FIG. 20($a$) is a diagram illustrating another example of the phase pattern displayed on the liquid crystal layer. FIG. 20($b$) is a diagram illustrating another example of the intensity distribution image captured by the profile acquisition camera.

FIG. 21($a$) is a diagram illustrating another example of the phase pattern displayed on the liquid crystal layer. FIG. 21($b$) is a diagram illustrating another example of the intensity distribution image captured by the profile acquisition camera.

FIG. 22($b$) is a diagram illustrating another example of the intensity distribution image captured by the profile acquisition camera.

DESCRIPTION OF EMBODIMENTS

Figure 1:
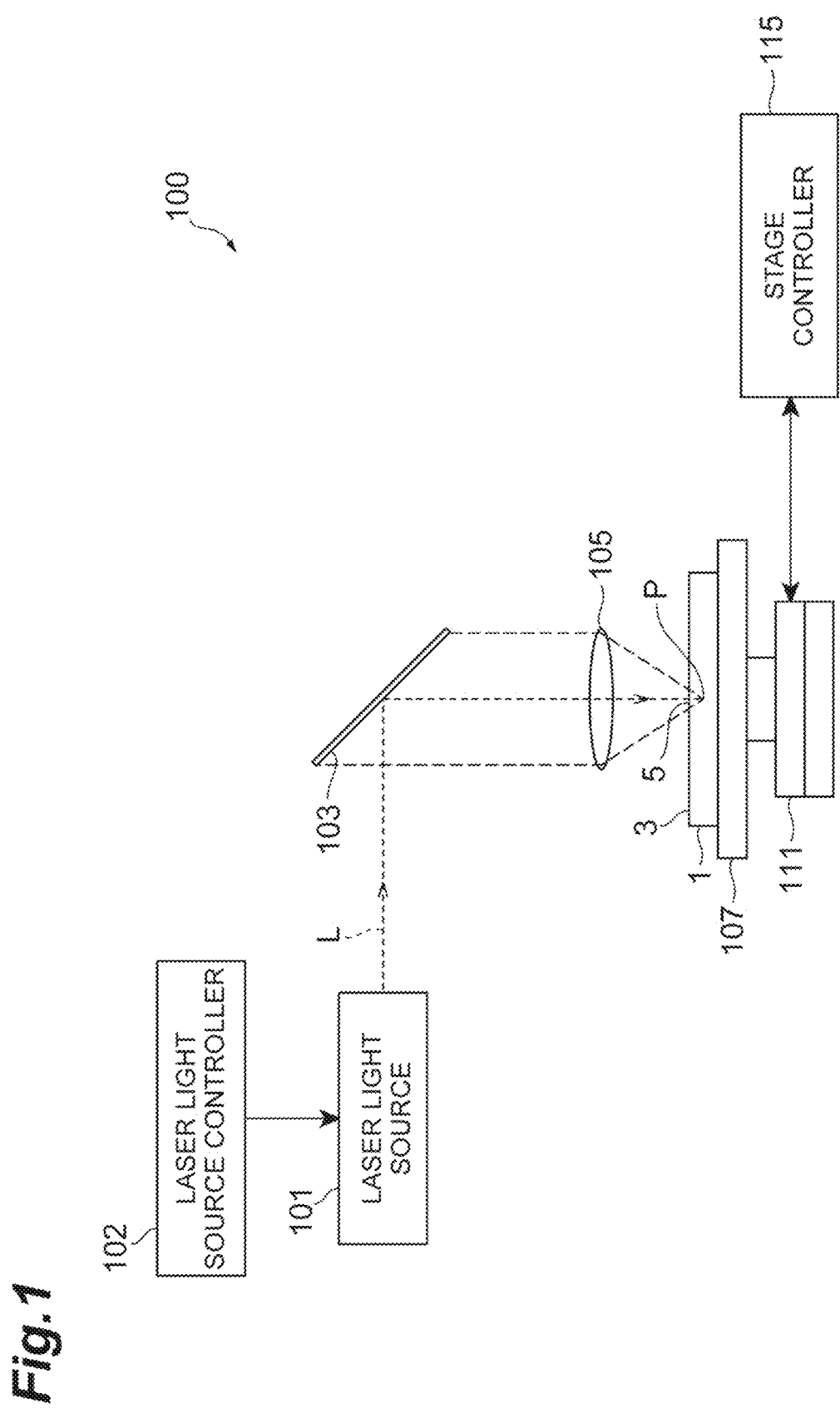
FIG. 1 is a schematic configuration diagram of a laser processing device used for forming a modified region.

In the following, embodiments will be described in detail with reference to the drawings. In the drawings, the same or equivalent parts will be denoted by the same reference signs, without redundant description.

A laser processing device (laser light irradiation device) according to the embodiments converges laser light at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to regulate the laser light source 101 in order to adjust the output, pulse width, pulse waveform, and the like of the laser light L, and a stage controller 115 configured to regulate the movement of the stage 111.

In the laser processing device 100, the laser light L emitted from the laser light source 101 changes the direction of its optical axis by 90° with the dichroic mirror 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
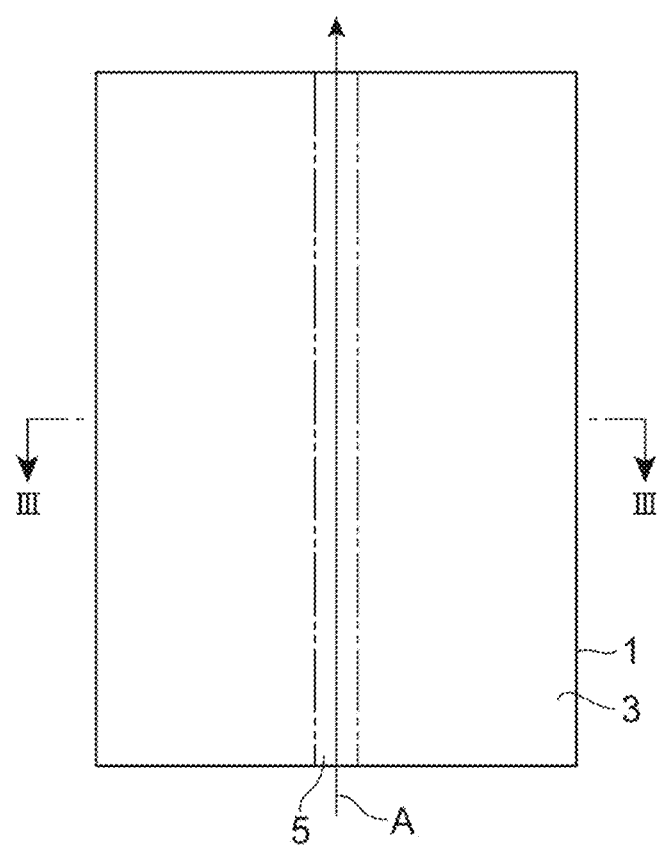
FIG. 2 is a plan view of an object to be processed for which the modified region is formed.
Figure 3:
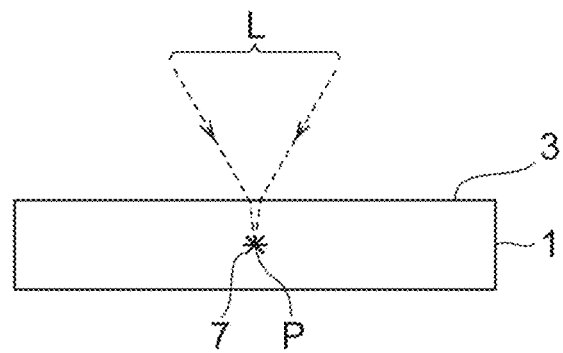
FIG. 3 is a sectional view of the object to be processed taken along the line HI-III of FIG. 2.
Figure 4:
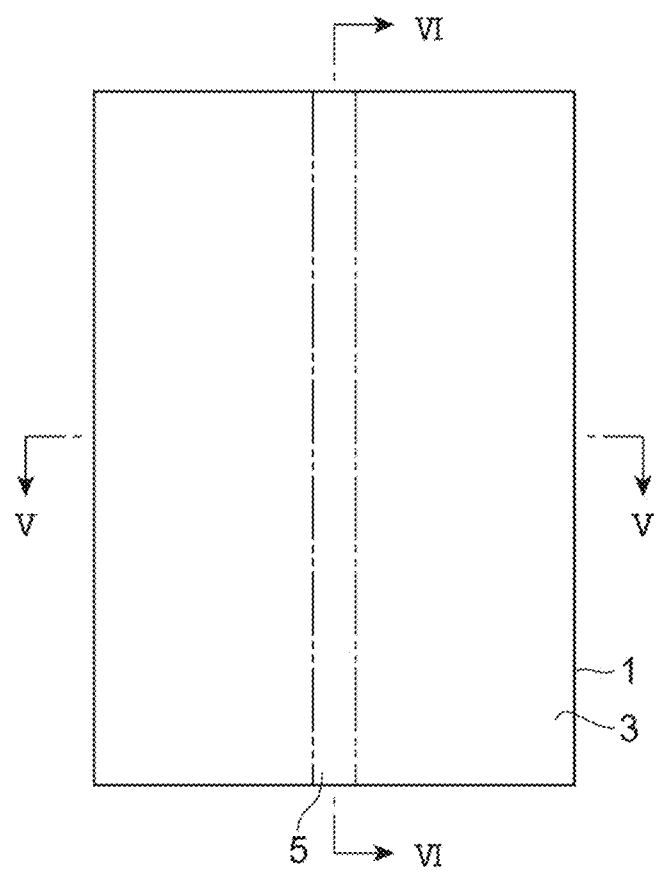
FIG. 4 is a plan view of the object to be processed after laser processing.
Figure 5:
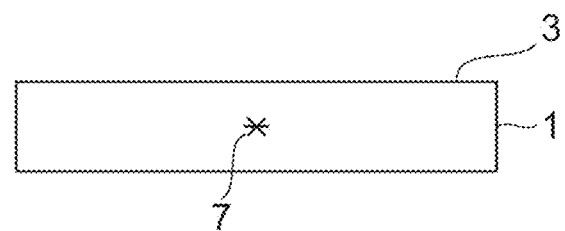
FIG. 5 is a sectional view of the object to be processed taken along the line V-V of FIG. 4.
Figure 6:
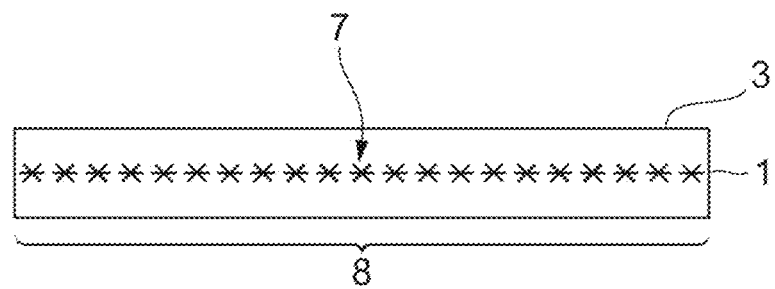
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5, and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is absorbed especially near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength, and other physical characteristics are different from the surroundings. Examples of the modified region 7 include a molten processed region (meaning at least one of a region resolidified after having been once molten, a region in the molten state, and a region in the process of resolidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), $LiTaO_3$, and sapphire ($Al_2O_3$). In other words, the object to be processed 1 includes, for example, a gallium nitride substrate, a silicon substrate, a SiC substrate, a $LiTaO_3$ substrate, or a sapphire substrate. The crystalline material may be either an anisotropic crystal or an isotropic crystal. Further, the object to be processed 1 may include a substrate made of a non-crystalline material having a non-crystalline structure (amorphous structure), and may include a glass substrate, for example.

In the embodiments, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spot can be formed as the modified region 7, along the line to cut 5.

[Laser Processing Device According to Embodiments]

Next, the laser processing device according to the embodiments will be described. In the following description, the directions orthogonal to each other in the horizontal plane are defined as the X-axis direction and the Y-axis direction, and the vertical direction is defined as the Z-axis direction.

[Overall Configuration of Laser Processing Device]

Figure 7:
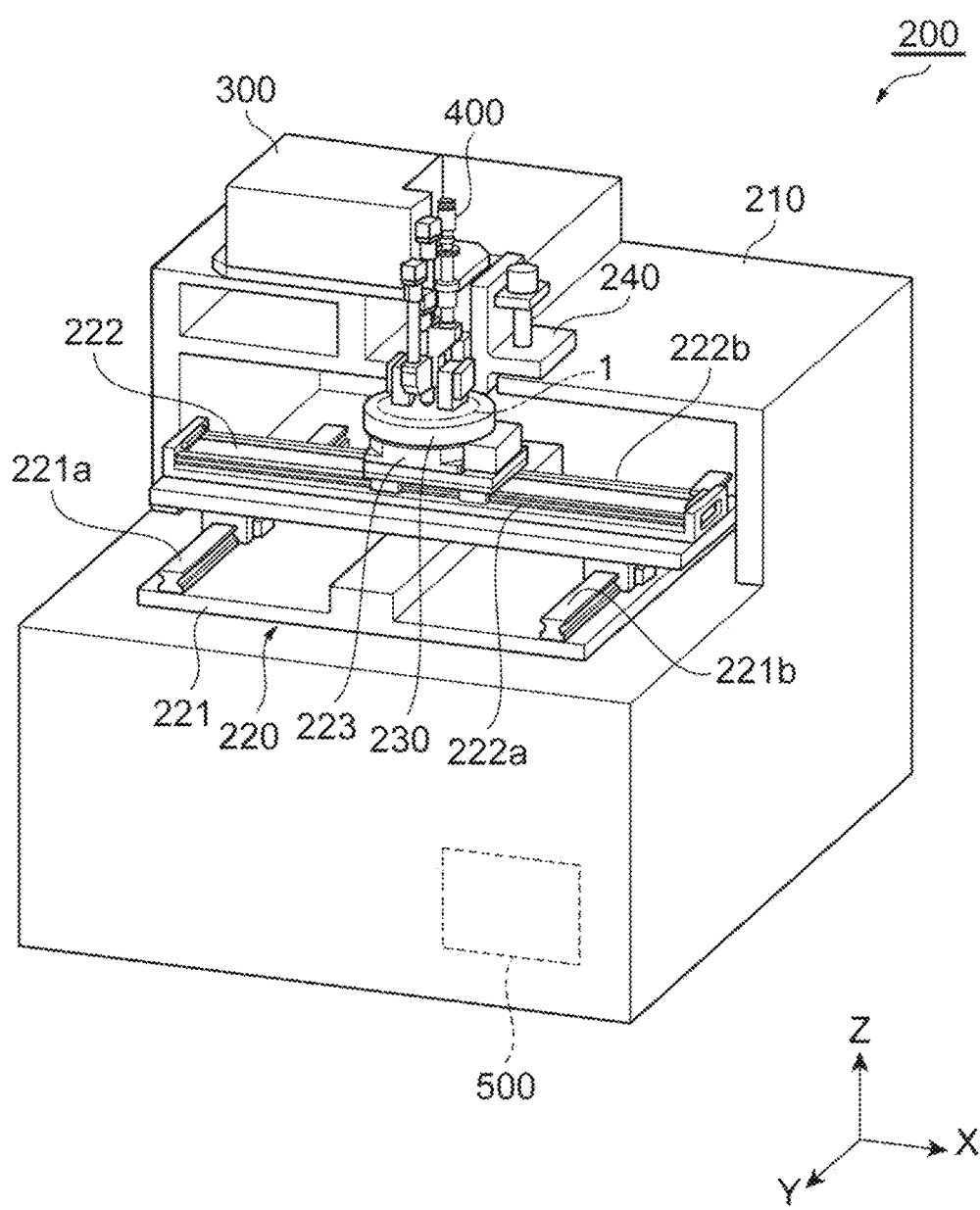
FIG. 7 is a perspective view of a laser processing device according to an embodiment.

As illustrated in FIG. 7, a laser processing device 200 includes a device frame 210, a first moving mechanism (moving mechanism) 220, a support table 230, and a second moving mechanism 240. Further, the laser processing device 200 includes a laser output unit 300, a laser converging unit 400, and a controller 500.

The first moving mechanism 220 is attached to the device frame 210. The first moving mechanism 220 includes a first rail unit 221, a second rail unit 222, and a movable base 223.

The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
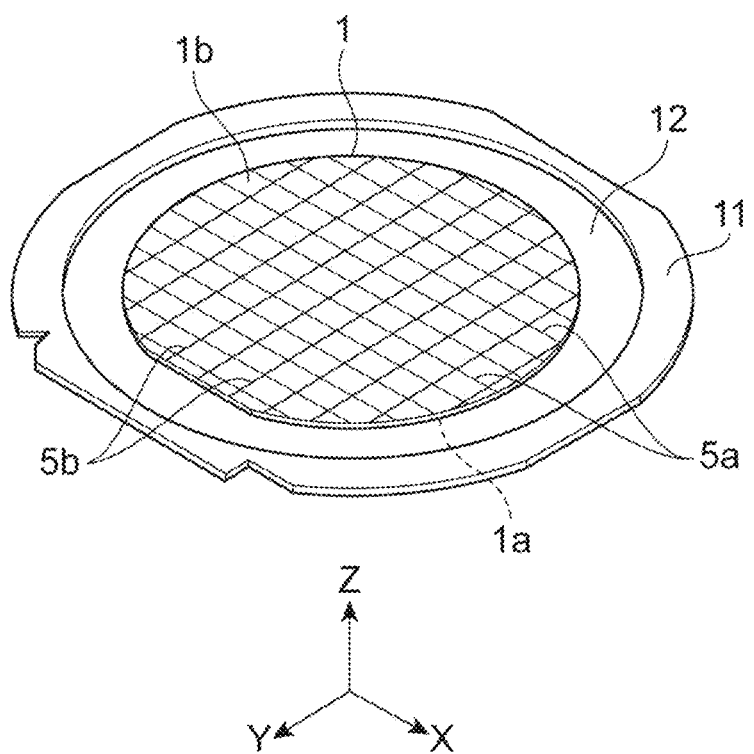
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a Central Processing Unit (CPU), Read Only Memory (ROM), Random Access Memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each of the lines to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each of the lines to cut 5a. Thus, the modified region is formed within the object to be processed 1 along each of the lines to cut 5a.

When the formation of the modified region along each of the lines to cut 5a is completed, the support table 230 is rotated by the first moving mechanism 220, and each of the lines to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each of the lines to cut 5b. Thus, the modified region is formed within the object to be processed 1 along each of the lines to cut 5b.

As described above, in the laser processing device 200, the direction parallel to the X-axis direction is a processing direction (scanning direction of the laser light L). The relative movement of the converging point of the laser light L along each of the lines to cut 5a and the relative movement of the converging point of the laser light L along each of the lines to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
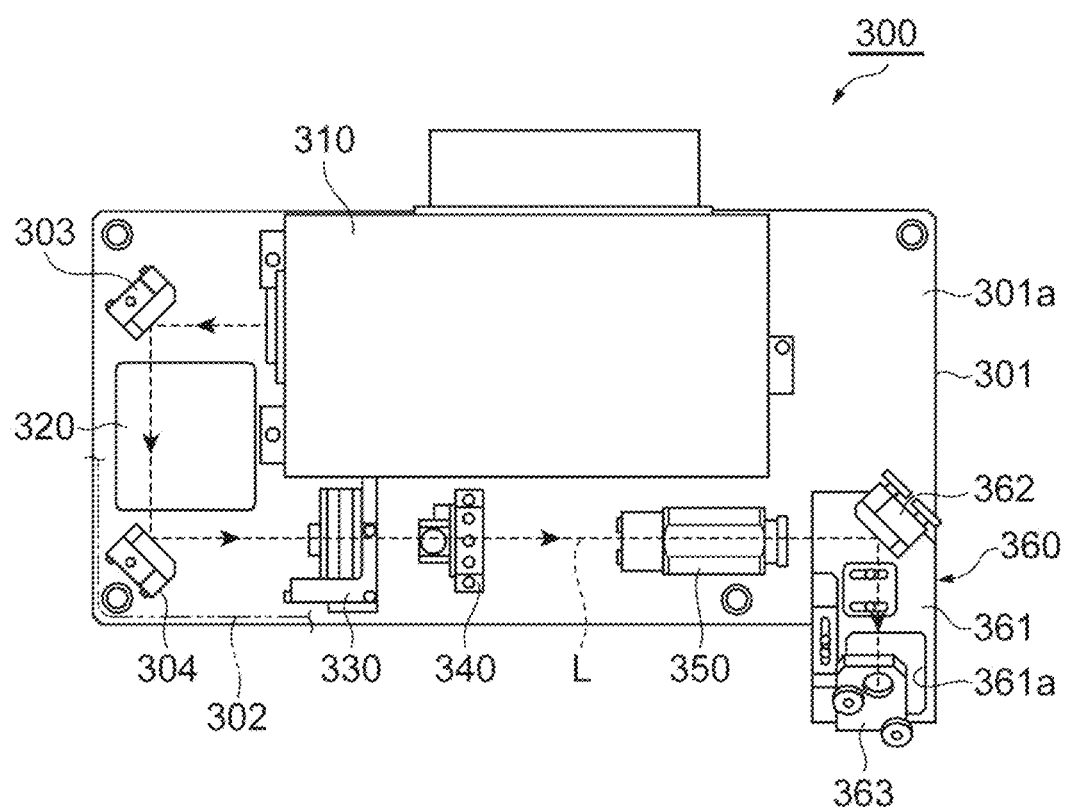
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator (laser light source) 310, a shutter 320, a λ/2 wave plate unit 330, a polarizing plate unit 340, a beam expander 350, and a mirror unit 360.

The mounting base 301 supports the plurality of mirrors 303 and 304, the laser oscillator 310, the shutter 320, the λ/2 wave plate unit 330, the polarizing plate unit 340, the beam expander 350, and the mirror unit 360. The plurality of mirrors 303 and 304, the laser oscillator 310, the shutter 320, the λ/2 wave plate unit 330, the polarizing plate unit 340, the beam expander 350, and the mirror unit 360 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the λ/2 wave plate unit 330, the polarizing plate unit 340, the beam expander 350, and the mirror unit 360 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 am is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing for a substrate made of silicon, for example. A polarization direction of the laser light L emitted from the laser oscillator 310 is, for example, a direction parallel to the Y-axis direction. The laser light L emitted from the laser oscillator 310 is reflected by the mirror 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the λ/2 wave plate unit 330 and the polarizing plate unit 340 along the X-axis direction.

The λ/2 wave plate unit 330 and the polarizing plate unit 340 function as the output adjusting unit configured to adjust the output (light intensity) of the laser light L. In addition, the λ/2 wave plate unit 330 and the polarizing plate unit 340 function as the polarization direction adjusting unit configured to adjust the polarization direction of the laser light L. The laser light L having sequentially passed through the λ/2 wave plate unit 330 and the polarizing plate unit 340 enters the beam expander 350 along the X-axis direction.

The beam expander 350 collimates the laser light L while adjusting a diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example. The mirror (second mirror) 363 reflects the laser light L reflected by the mirror 362 in the Z-axis direction. The mirror 363 is attached to the support base 361 such that its reflective surface is angle adjustable around an axis parallel to the X-axis, for example, and is position adjustable along the Y-axis direction. The laser light L reflected by the mirror 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 has a mechanism for adjusting the angle of the reflective surface. In the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed, whereby the position and the angle of the optical axis of the laser light L emitted from the laser output unit 300 are aligned with respect to the laser converging unit 400. That is, each of the plurality of mirrors 362 and 363 is a component for adjusting the optical axis of the laser light L emitted from the laser output unit 300.

Figure 10:
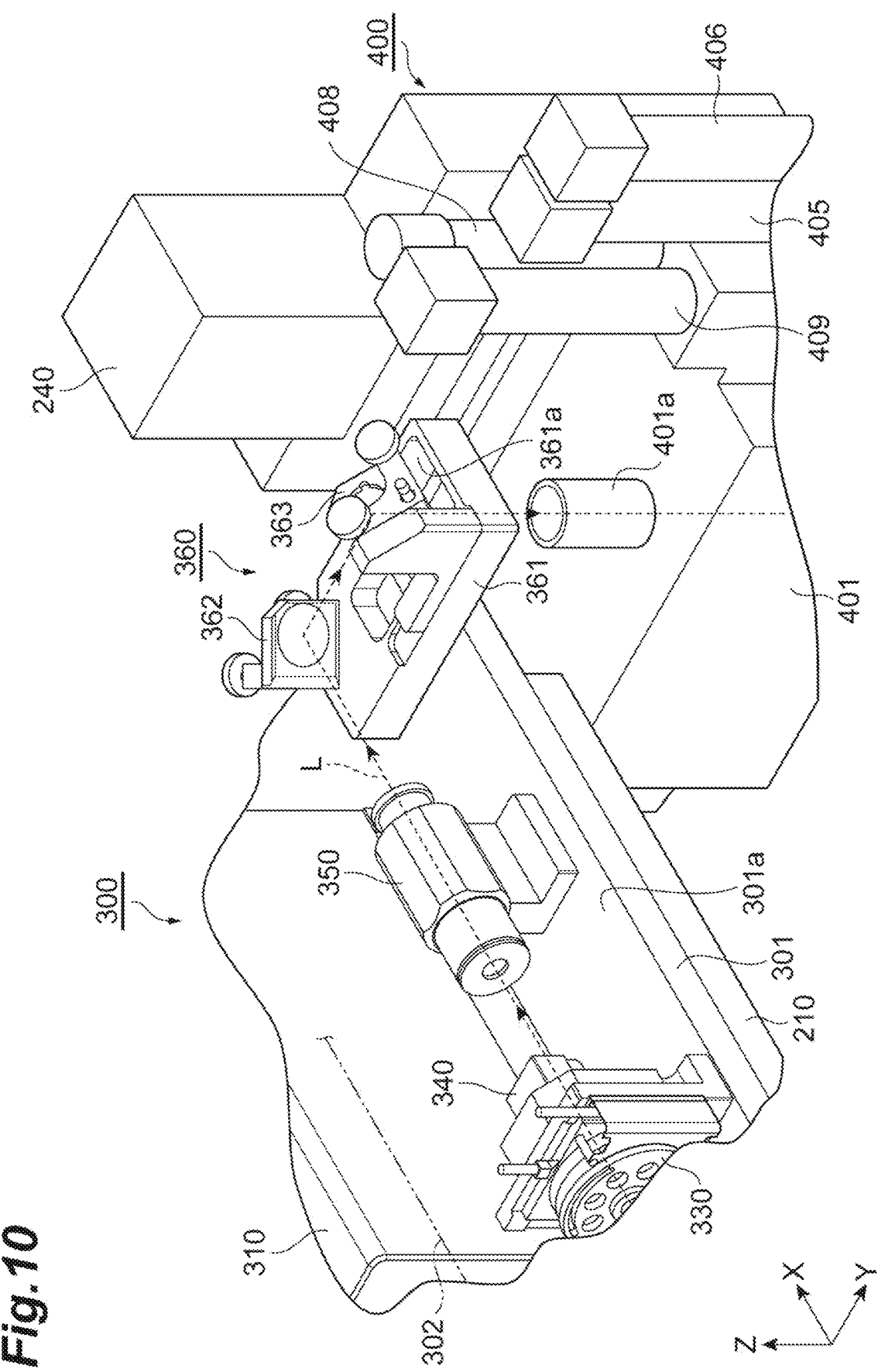
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
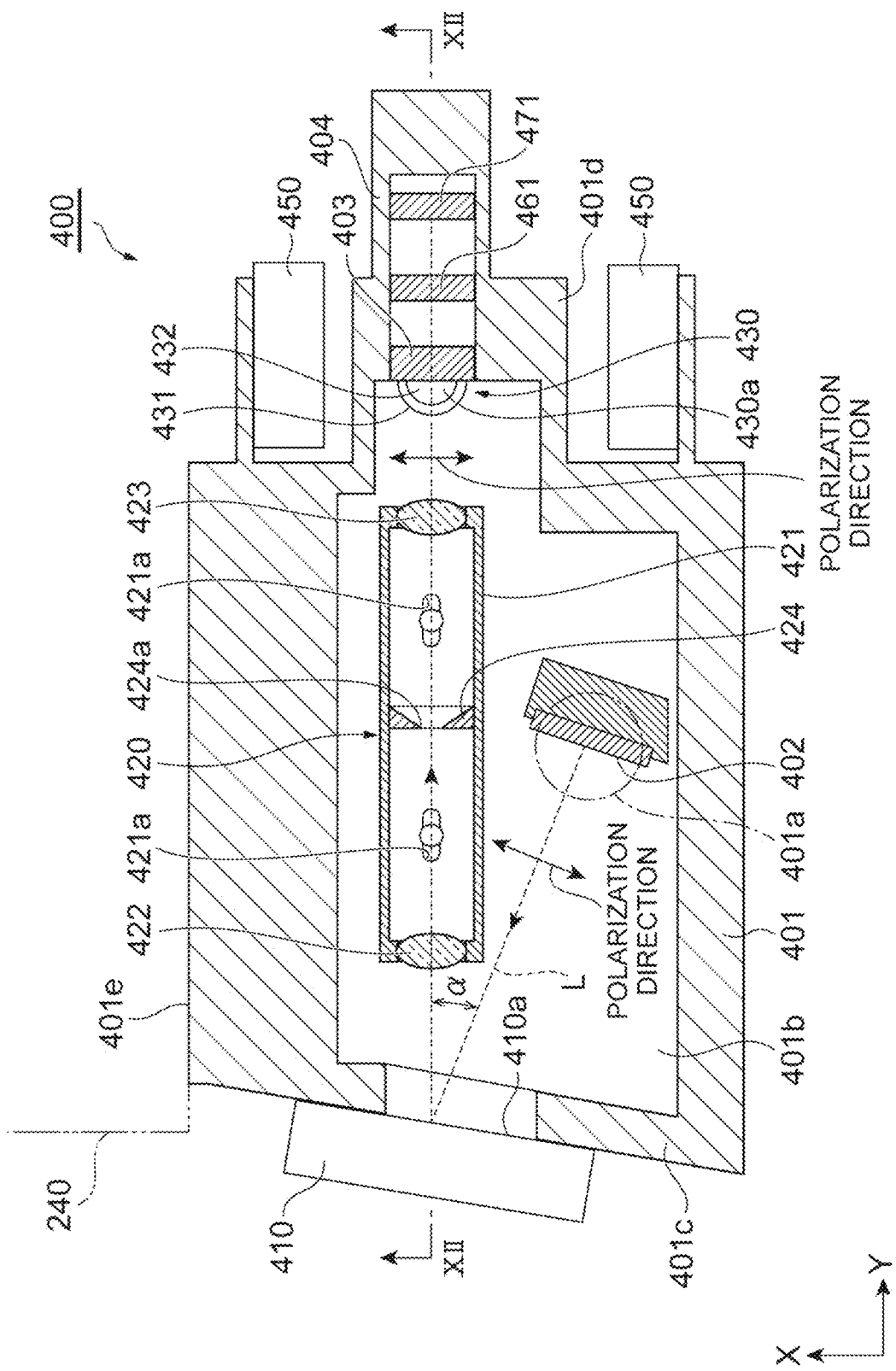
FIG. 11 is a sectional view of the laser converging unit taken along the KY plane of FIG. 7.
Figure 12:
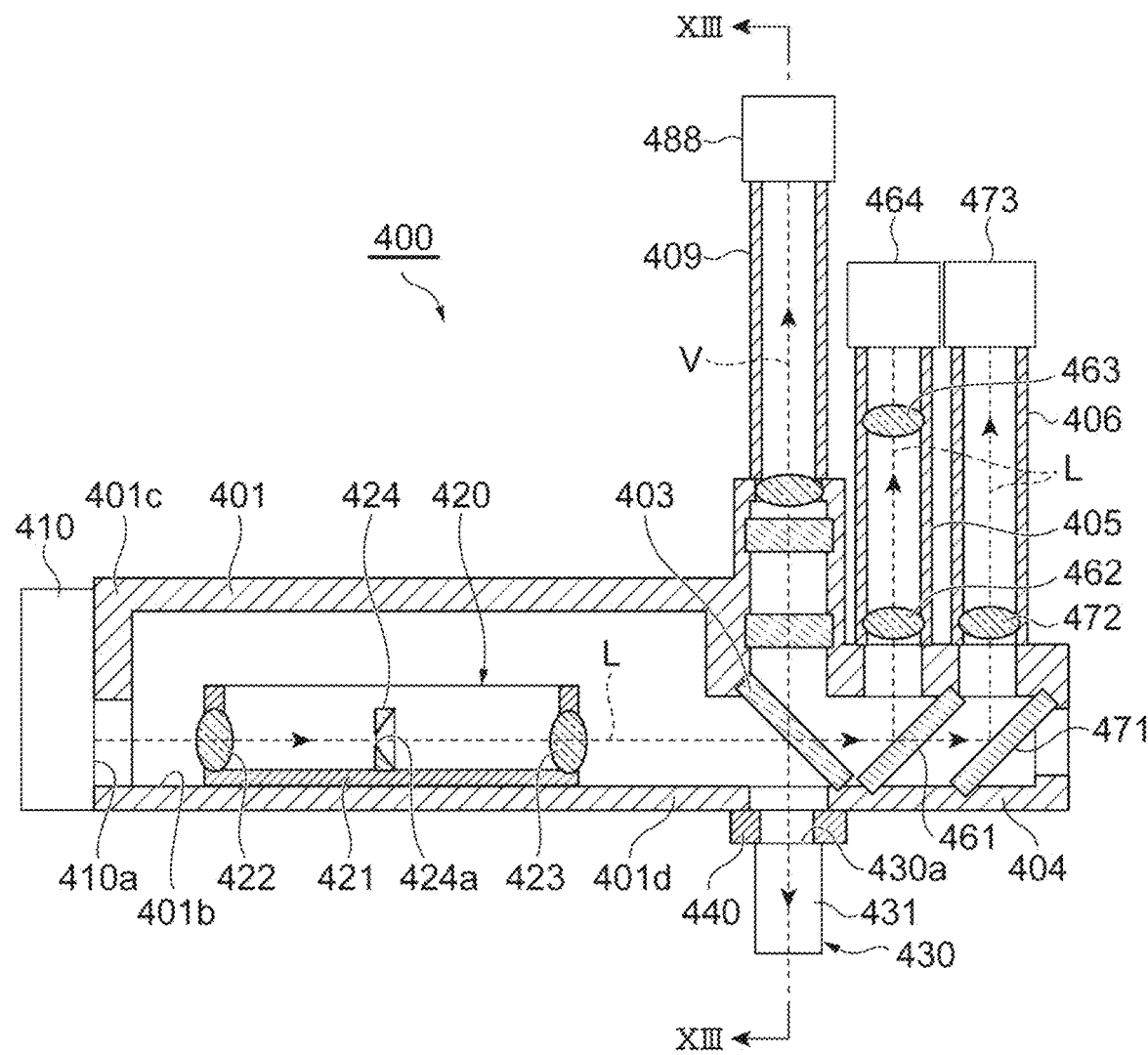
FIG. 12 is a sectional view of the laser converging unit taken along the line XII-XII of FIG. 11.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (objective lens) 430, a drive mechanism 440, and a pair of distance measuring sensors 450.

The mirror 402 is attached to a bottom surface 401b of the housing 401 so as to face the light entrance unit 401a in the Z-axis direction. The mirror 402 reflects the laser light L having entered the housing 401 via the light entrance unit 401a in a direction parallel to the XY plane. The laser light L collimated by the beam expander 350 of the laser output unit 300 enters the mirror 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state is maintained of the laser light L entering the mirror 402 along the Z-axis direction. The laser light L reflected by the mirror 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (Liquid Crystal on Silicon (LCOS)) Spatial Light Modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°). That is, the laser light L is reflected at an acute angle along the XY plane in the reflective spatial light modulator 410. This is for suppressing an incident angle and a reflection angle of the laser light L to inhibit the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens 422 on the reflective spatial light modulator 410 side, a lens 423 on the converging lens unit 430 side, and a slit member 424. The holder 421 holds a pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane (pupil plane) 430a of the converging lens unit 430 are in an imaging relationship. Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane by the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensor 450 such that a constant distance is maintained between the laser light entrance surface of the object to be processed 1 and the converging point of the laser light L.

The laser converging unit 400 includes a beam splitter 461, a pair of lenses 462 and 463, and a profile acquisition camera (intensity distribution acquisition unit) 464. The beam splitter 461 divides the laser light L transmitted through the dichroic mirror 403 into a reflection component and a transmission component. The laser light L reflected by the beam splitter 461 sequentially enters the pair of lenses 462 and 463, and the profile acquisition camera 464 along the Z-axis direction. The pair of lenses 462 and 463 constitutes a double telecentric optical system in which the entrance pupil plane 430a of the converging lens unit 430 and an imaging surface of the profile acquisition camera 464 are in an imaging relationship. Thus, an image of the laser light L on the entrance pupil plane 430a of the converging lens unit 430 is transferred to (imaged on) the imaging surface of the profile acquisition camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the profile acquisition camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the laser light L having entered, on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the profile acquisition camera 464 is arranged at an end of the cylindrical body 405. The lens 472 is arranged in a cylindrical body 406 erected on the cylindrical body 404 along the π-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

Figure 13:
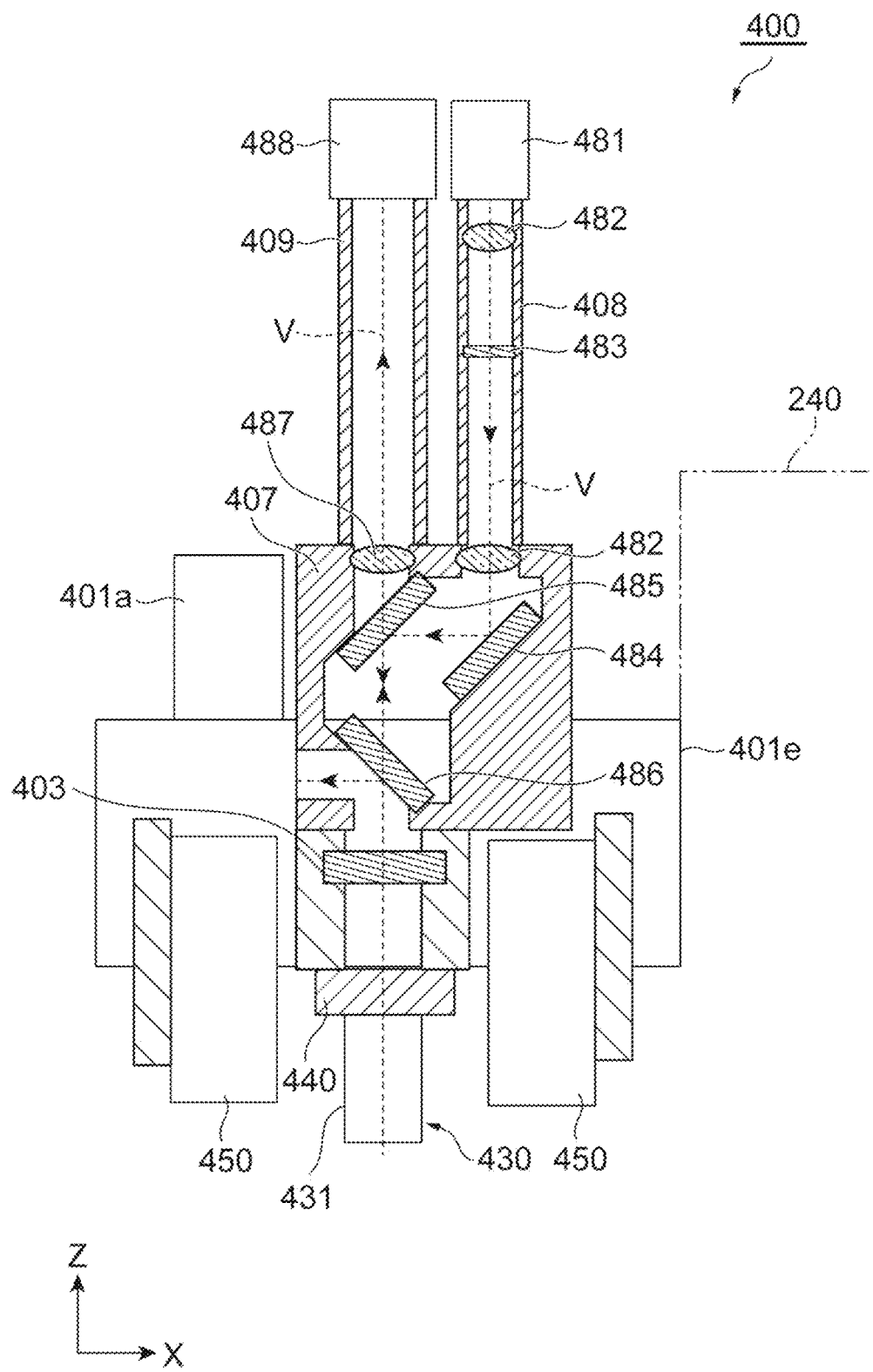
FIG. 13 is a sectional view of the laser converging unit taken along the line XIII-XIII of FIG. 12.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (See FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the visible light V having entered, on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In the laser processing device 200, replacement of the laser output unit 300 is assumed. This is because the wavelength of the laser light L suitable for processing varies depending on the specifications of the object to be processed 1, processing conditions, and the like. For that reason, a plurality of the laser output units 300 is prepared having respective wavelengths of emitting laser light L different from each other. Here, prepared are the laser output unit 300 in which the wavelength of the emitting laser light L is included in the wavelength band of from 500 nm to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands not continuous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths. Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. In the laser output unit 300, the $\lambda/2$ wave plate unit 330 includes a $\lambda/2$ wave plate, and the polarizing plate unit 340 includes a polarizing plate. The $\lambda/2$ wave plate and the polarizing plate are optical devices having high wavelength dependence. For that reason, the $\lambda/2$ wave plate unit 330 and the polarizing plate unit 340 are provided in the laser output unit 300 as different components for each wavelength band.

[Optical Path and Polarization Direction of Laser Light in laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is inhibited (for example, see Japanese Patent No. 3878758). On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction. Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the output adjusting unit configured to adjust the output of the laser light L but also as the polarization direction adjusting unit configured to adjust the polarization direction of the laser light L.

[Reflective Spatial Light Modulator]

Figure 14:
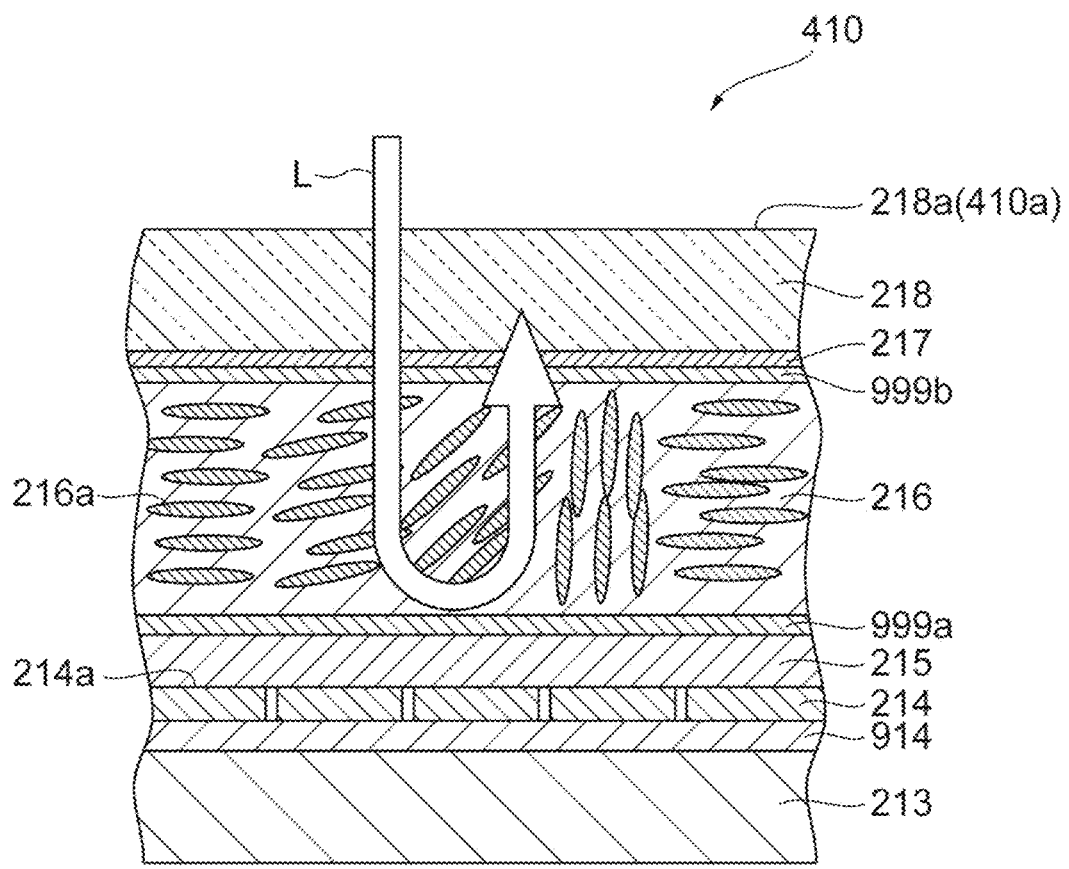
FIG. 14 is a partial sectional view of a reflective spatial light modulator of the laser processing device of FIG. 7.

As illustrated in FIG. 14, the reflective spatial light modulator 410 includes a silicon substrate 213, a drive circuit layer 914, a plurality of pixel electrodes 214, a reflecting film 215 such as a dielectric multilayer mirror, an alignment film 999a, a liquid crystal layer (display unit) 216, an alignment film 999b, a transparent conductive film 217, and a transparent substrate 218 such as a glass substrate, which are layered in this order.

The transparent substrate 218 includes a front surface 218a extending along the XY plane, and the front surface 218a constitutes the reflective surface 410a of the reflective spatial light modulator 410. The transparent substrate 218 is made of a light transmitting material such as glass, for example, and transmits the laser light L of a predetermined wavelength having entered from the front surface 218a of the reflective spatial light modulator 410 to the inside of the reflective spatial light modulator 410. The transparent conductive film 217 is formed on a back surface of the transparent substrate 218, and is made of a conductive material (for example, ITO) that transmits the laser light L.

The plurality of pixel electrodes 214 is arranged in a matrix on the silicon substrate 213 along the transparent conductive film 217. Each of the pixel electrodes 214 is made of a metal material such as aluminum, for example, and its front surface 214a is processed to be flat and smooth. The plurality of pixel electrodes 214 is driven by an active matrix circuit provided in the drive circuit layer 914.

The active matrix circuit is provided between the plurality of pixel electrodes 214 and the silicon substrate 213, and controls an applied voltage to each of the pixel electrodes 214 in accordance with a light image to be output from the reflective spatial light modulator 410. Such active matrix circuit includes a first driver circuit configured to control the applied voltage for pixel rows arranged in the X-axis direction, and a second driver circuit configured to control the applied voltage for pixel rows arranged in the Y-axis direction, which are not illustrated, for example, and a predetermined voltage is applied to the pixel electrode 214 of a pixel specified by the driver circuits, by a spatial light modulator controller 502 (see FIG. 16) described later in a controller 5000.

The alignment films 999a and 999b are arranged on both end surfaces of the liquid crystal layer 216, respectively, so as to align a liquid crystal molecule group in a certain direction. The alignment films 999a and 999b are made of a polymer material such as polyimide, and rubbing treatment or the like is applied to contact surfaces with the liquid crystal layer 216.

The liquid crystal layer 216 is arranged between the plurality of pixel electrodes 214 and the transparent conductive film 217 and modulates the laser light L in accordance with an electric field formed by each of the pixel electrodes 214 and the transparent conductive film 217. That is, when a voltage is applied to each of the pixel electrodes 214 by the active matrix circuit of the drive circuit layer 914, an electric field is formed between the transparent conductive film 217 and each of the pixel electrodes 214, and arrangement direction of liquid crystal molecules 216a changes in accordance with the magnitude of the electric field formed in the liquid crystal layer 216. When the laser light L is transmitted through the transparent substrate 218 and the transparent conductive film 217 and enters the liquid crystal layer 216, the laser light L is modulated by the liquid crystal molecules 216a while passing through the liquid crystal layer 216, and reflected by the reflecting film 215, and then modulated again by the liquid crystal layer 216, and emitted.

At this time, the voltage applied to each of the pixel electrodes 214 is controlled by the spatial light modulator controller 502 (see FIG. 16) described later, and, in accordance with the voltage, a refractive index changes in a portion sandwiched between the transparent conductive film 217 and each of the pixel electrodes 214 in the liquid crystal layer 216 (the refractive index changes of the liquid crystal layer 216 at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel. In other words, a modulation pattern as the hologram pattern applying the modulation can be displayed on the liquid crystal layer 216 of the reflective spatial light modulator 410. The wavefront is adjusted of the laser light L that enters and is transmitted through the modulation pattern, and shifts occur in phases of components of individual rays constituting the laser light L in a predetermined direction orthogonal to their advancing direction. Therefore, the laser light L can be modulated (for example, intensity, amplitude, phase, and polarization of the laser light L can be modulated) by appropriately setting the modulation pattern to be displayed in the reflective spatial light modulator 410.

[4f Lens Unit]

Figure 15:
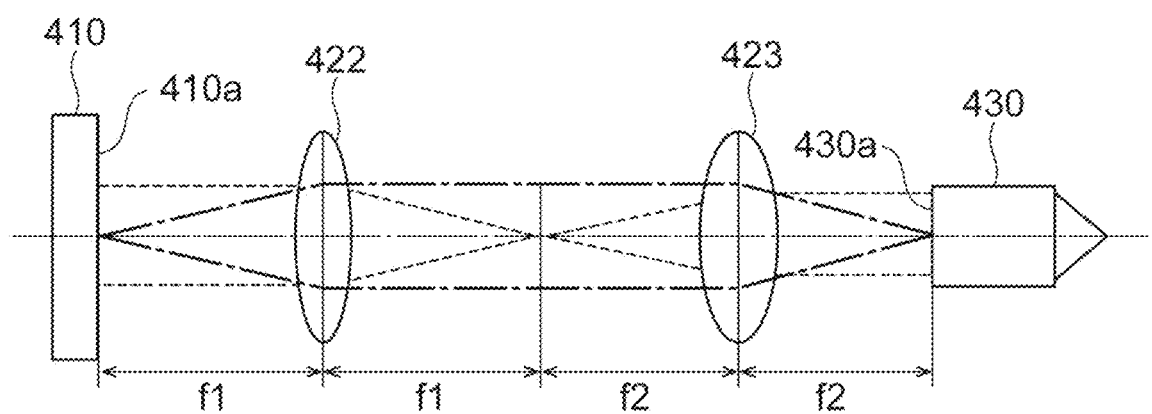
FIG. 15 is a diagram illustrating an optical arrangement relationship among the reflective spatial light modulator, a 4$f$ lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 15, the distance of the optical path between the center of the lens 422 on the reflective spatial light modulator 410 side and the reflective surface 410a of the reflective spatial light modulator 410 is a first focal length f1 of the lens 422, the distance of the optical path between the center of the lens 423 on the converging lens unit 430 side and the entrance pupil plane 430a of the converging lens unit 430 is a second focal length f2 of the lens 423, and the distance of the optical path between the center of the lens 422 and the center of the lens 423 is a sum of the first focal length f1 and the second focal length 12 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter of the laser light L on the reflective surface 410a of the reflective spatial light modulator 410 is increased, the laser light L is modulated with a high-precision phase pattern. From a viewpoint of inhibiting the optical path from becoming longer of the laser light L from the reflective spatial light modulator 410 to the converging lens unit 430, it is possible to set 0.6≤M≤0.95. Here, (the magnification M of the double telecentric optical system)= (the size of the image on the entrance pupil plane 430a of the converging lens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is possible to set 1.05≤M≤1.7.

Next, a main part of the laser processing device 200 according to a first embodiment will be described in detail.

Figure 16:
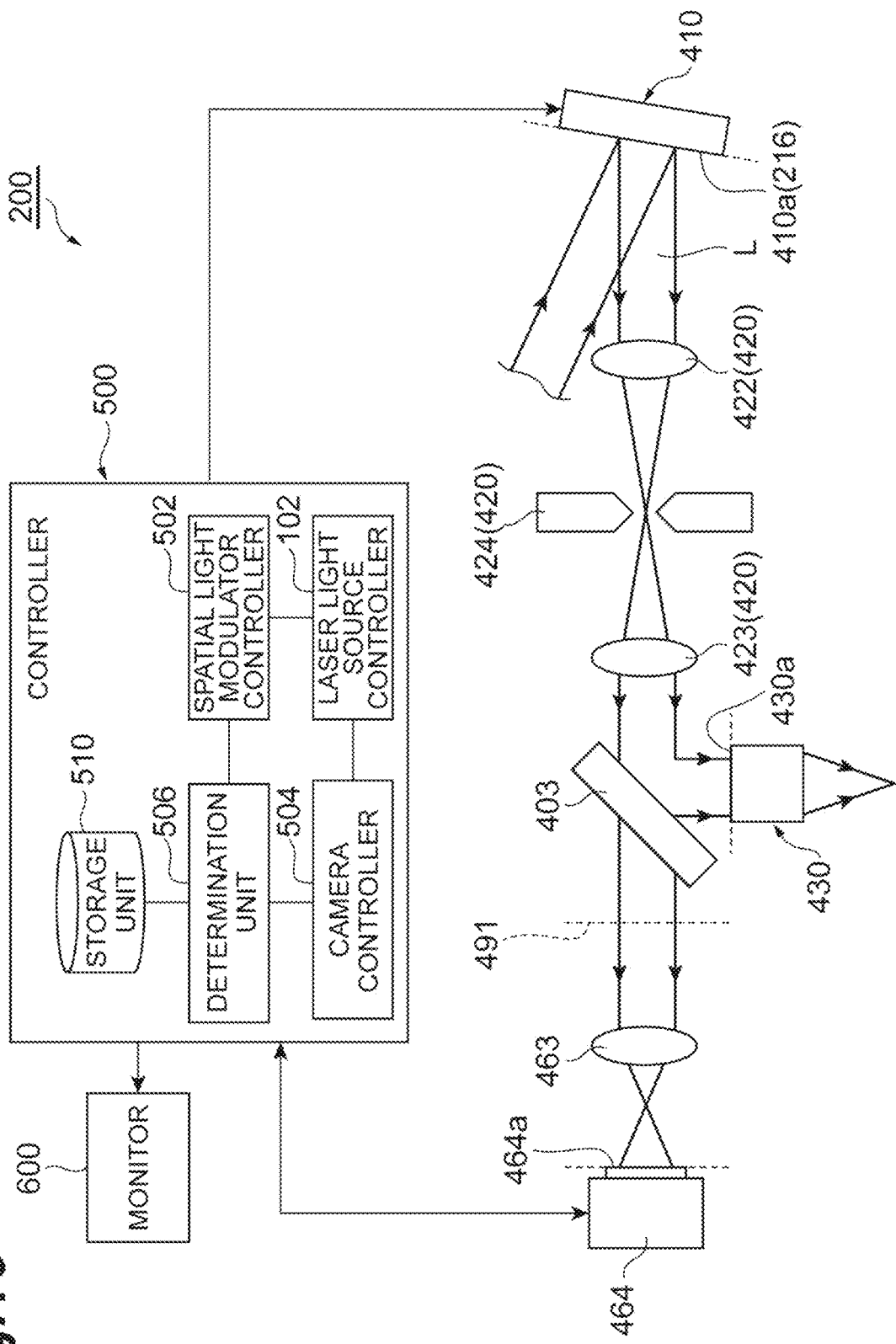
FIG. 16 is a schematic configuration diagram illustrating a main part of a laser processing device according to a first embodiment.

FIG. 16 is a schematic configuration diagram illustrating the main part of the laser processing device 200 according to the first embodiment. As illustrated in FIG. 16, the laser light L having entered and been reflected by the liquid crystal layer 216 in the reflective spatial light modulator 410 is focused by the lens (focusing lens) 422 that is a relay lens of the 4f lens unit 420, and then collimated by the lens 423 that is a relay lens of the 4f lens unit 420, and enters the dichroic mirror 403.

The laser light L having entered the dichroic mirror 403 is split into reflected light and transmitted light. The laser light L reflected by the dichroic mirror 403 enters the converging lens unit 430 and is converged at the object to be processed 1 by the converging lens unit 430. On the other hand, the laser light L transmitted through the dichroic mirror 403 is focused by the lens 463 that is a relay lens, and enters an imaging surface 464a of the profile acquisition camera 464.

The pair of lenses 422 and 423 relays the wavefront of the laser light L on the reflective surface 410a of the liquid crystal layer 216 to the entrance pupil plane 430a of the converging lens unit 430 and a conjugate plane 491 on the downstream side of the dichroic mirror 403. The lens 463 relays (images) the wavefront of the laser light L (real image in the liquid crystal layer 216) relayed to the conjugate plane 491 by the pair of lenses 422 and 423, to the imaging surface 464a of the profile acquisition camera 464. Thus, a conjugate relationship is configured with each other among the liquid crystal layer 216, the entrance pupil plane 430a of the converging lens unit 430, the conjugate plane 491, and the imaging surface 464a of the profile acquisition camera 464.

The profile acquisition camera 464 is an imaging device configured to acquire the intensity distribution of the laser light L split by the dichroic mirror 403. Specifically, the profile acquisition camera 464 captures an image of the intensity distribution of a beam cross section (hereinafter, simply referred to as "intensity distribution image") of the laser light L before entering the converging lens unit 430 emitted from the reflective spatial light modulator 410, during execution of laser light irradiation control described later. The profile acquisition camera 464 captures one or a plurality of the intensity distribution images as still images during the execution of the laser light irradiation control along one line to cut 5. The profile acquisition camera 464 outputs the captured intensity distribution image to the controller 500. As the profile acquisition camera 464, for example, a Complementary Metal Oxide Semiconductor (CMOS) image sensor is used.

The slit member 424 is arranged at a focal position of a first lens 241a in the optical path of the laser light L. The slit member 424 shields a spatial frequency component (wide angle diffracted light) of greater than or equal to a constant value in the laser light L and allows a spatial frequency component of less than the constant value in the laser light L to pass therethrough. For example, in the slit member 424, the size of the opening is set so as to shield the spatial frequency component of greater than or equal to the constant value.

Incidentally, the slit member 424 may be arranged near the focal position of the first lens 241a. Near the focal position is a substantial focal position, the vicinity of the focal position, or the periphery of the focal position, and is a range in which the slit member 424 can shield the spatial frequency component of greater than or equal to the constant value in the laser light L (the same applies hereinafter). In the laser light L after passing through the slit member 424, modulation of the laser light L by the reflective spatial light modulator 410 can be easily observed as intensity modulation.

The controller 500 includes the laser light source controller 102, the spatial light modulator controller 502, a camera controller 504, a determination unit 506, and a storage unit 510. The laser light source controller 102 controls operation of the laser oscillator 310 as described above. In addition, the laser light source controller 102 determines and sets the output of the laser light L generated by the laser oscillator 310 on the basis of processing conditions (irradiation conditions) for each laser processing along one line to cut 5. The processing conditions are input by an operator via an input unit such as a touch screen. The processing conditions include, for example, a depth position at which the modified region 7 of the object to be processed 1 is formed, the laser output, and the like.

Figure 18:
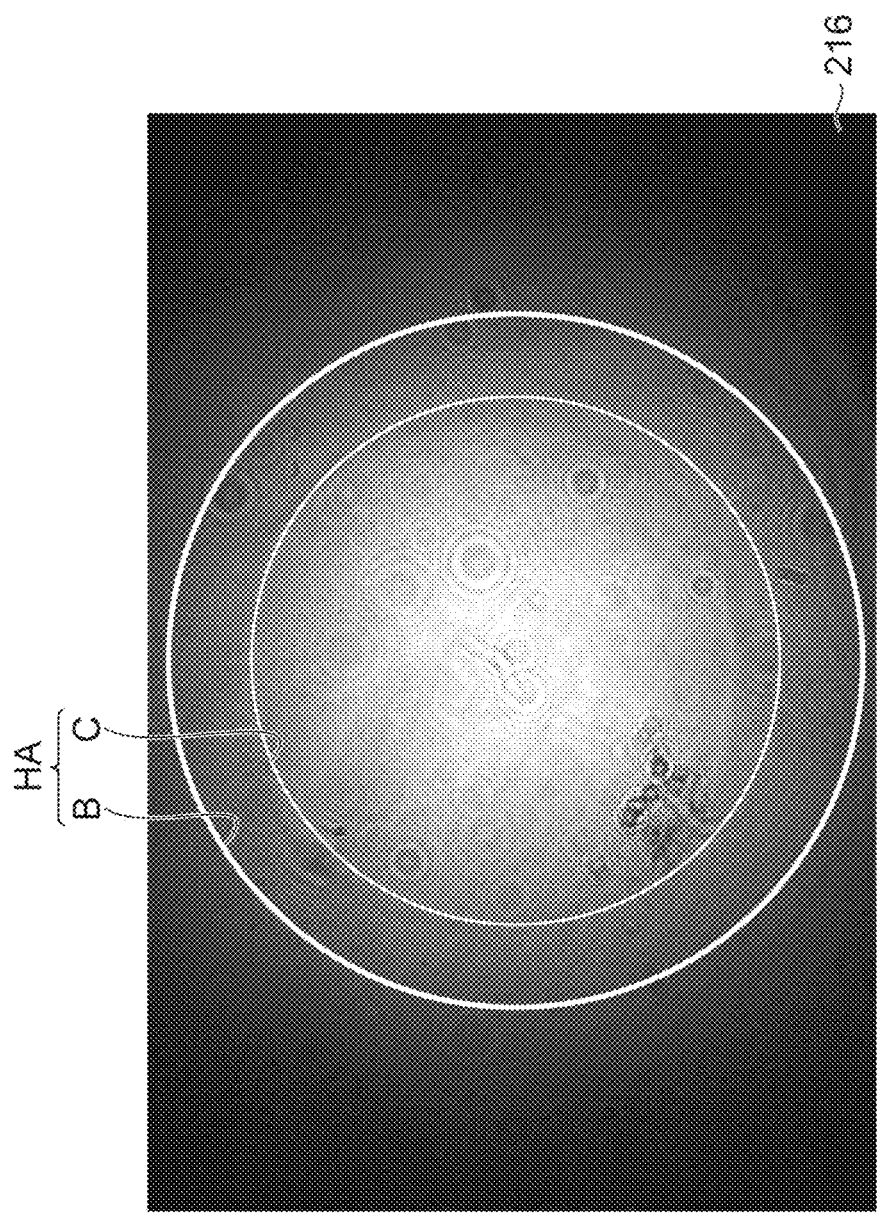
FIG. 18 is a diagram describing a position where a marking is displayed in the liquid crystal layer.

The spatial light modulator controller 502 controls the phase pattern to be displayed on the liquid crystal layer 216 of the reflective spatial light modulator 410. FIG. 17(a) is a diagram illustrating an example of a phase pattern 9 displayed on the liquid crystal layer 216. FIG. 18 is a diagram describing a position where the marking is displayed. As illustrated in FIGS. 17(a) and 18, the spatial light modulator controller 502 controls the liquid crystal layer 216 to display the phase pattern 9 including a body pattern 9H and a marking 9M on the liquid crystal layer 216. The phase pattern 9 is the modulation pattern described above and modulates the laser light L.

The marking 9M modulates part, in the laser light L, not entering the entrance pupil plane 430a of the converging lens unit 430. The marking 9M is located in a markable region B from which the part, of the laser light L, not entering the entrance pupil plane 430a of the converging lens unit 430 (that is, part, in the laser light L, to be cut by an aperture of the converging lens unit 430) is emitted, in a region HA on which the laser light L strikes in the liquid crystal layer 216. Here, the region HA on which the laser light L strikes is a circular region, and the markable region B is an annular region at the outer edge of the region HA. The marking 9M is a pattern including at least one of a phase region of a spatial frequency component of greater than or equal to the constant value and a phase region of a spatial frequency component of less than the constant value. Such a marking 9M is set corresponding to the body pattern 9H, and is different for each body pattern 9H.

The body pattern 9H modulates other part of the laser light entering the pupil plane of the converging lens unit 430. The body pattern 9H is located in a processing use region C from which the other part, of the laser light L, entering the entrance pupil plane 430a of the converging lens unit 430 (that is, other part, in the laser light L, not to be cut by the converging lens unit 430) is emitted, in the region HA on which the laser light L strikes in the liquid crystal layer 216. The processing use region C is a circular region existing inside the markable region B in the region HA.

For example, in a case where the laser light L is a Gaussian beam, when a Gaussian beam radius w is used that is the width at which the intensity of the laser light L is 13.5% ($1/e^2$%) of its peak, the processing use region C is a circular region having the Gaussian beam radius w as its radius. For example, the markable region B is an annular region having the Gaussian beam radius w as its inner radius and 1.22 times the Gaussian beam radius w (=1.22w) as its outer radius. A position of 1.22 times the Gaussian beam radius w is a position where the intensity of the laser light L is about 5% of the peak. In addition, for example, in the liquid crystal layer 216, an S/N ratio in the case of marking an outer edge BE of the markable region B differs by 2.7 times (13.5/5 times) from an S/N ratio in the case of marking an outer edge CE of the processing use region C.

In the example illustrated in FIG. 17(a), in the liquid crystal layer 216, the phase pattern 9 including the body pattern 9H and the marking 9M is displayed on a background image of a grating pattern that is a phase region of a high spatial frequency component shielded by the slit member 424. The marking 9M includes rectangular dark color regions arranged in a staggered pattern, the dark color regions being phase regions of spatial frequency components that are not shielded by the slit member 424.

Referring back to FIG. 16, the spatial light modulator controller 502 sets the body pattern 9H on the basis of the processing conditions, and sets the marking 9M corresponding to the body pattern 9H, for each laser processing along one line to cut 5. That is, the spatial light modulator controller 502 sets the phase pattern 9 formed by writing the marking 9M corresponding to the body pattern 9H in the body pattern 9H set from the processing conditions, for each laser processing along one line to cut 5. The spatial light modulator controller 502 outputs information on the image of the marking 9M to be displayed on the liquid crystal layer 216, to the determination unit 506.

The camera controller 504 controls operation of the profile acquisition camera 464. The camera controller 504 acquires and recognizes the intensity distribution image from the profile acquisition camera 464. The camera controller 504 extracts and recognizes a marking intensity image that is an image corresponding to the marking 9M on the intensity distribution image, from the intensity distribution image. The camera controller 504 outputs the marking intensity image to the determination unit 506.

The camera controller 504 varies shutter time of the profile acquisition camera 464 in accordance with the magnitude of the output of the laser light L set by the laser light source controller 102, for each laser processing along one line to cut 5. Specifically, the camera controller 504 includes a data table relating to the output of the laser light L and the shutter time. The camera controller 504 uses the data table to set the shutter time for each laser processing along each of the lines to cut 5 from the magnitude of the output of the laser light L. For example, the camera controller 504 decreases the shutter time as the output of the laser light L increases, or increases the shutter time as the output decreases so that a constant luminance value of the intensity distribution image (amount of light on the profile acquisition camera 464) is maintained. Note that, in addition to the shutter time, the camera controller 504 may vary gain (sensitivity) in the same manner.

The determination unit 506 determines whether or not the reflective spatial light modulator 410 has normally operated, on the basis of the marking 9M to be displayed on the liquid crystal layer 216 by the spatial light modulator controller 502 and the marking intensity image, for each laser processing along one line to cut 5. Specifically, the determination unit 506 determines whether or not the marking 9M to be displayed on the liquid crystal layer 216 and the marking intensity image coincide with each other, by a known image matching method, at the time of laser processing of each of the lines to cut 5. In a case where the marking 9M and the marking intensity image coincide with each other, it is determined that the reflective spatial light modulator 410 has normally operated in laser processing of the line to cut 5. The determination unit 506 outputs a determination result to the storage unit 510. Not that, a method of determining coincidence of the marking 9M and the marking intensity image is not particularly limited, and various methods can be used.

The storage unit 510 stores the determination result of the determination unit 506 as a log for each laser processing along one line to cut 5. For example, the storage unit 510 accumulates the determination result as a log in association with coordinates of each of the lines to cut 5.

Such a controller 500 executes the laser light irradiation control, that is, control in which while the phase pattern 9 set for each of the plurality of lines to cut 5 is displayed on the liquid crystal layer 216 along each of the lines to cut 5, and the laser light L is emitted to the object to be processed 1 with the output set for each of the lines to cut 5, the first moving mechanism 220 is driven to relatively move the laser light L with respect to the object to be processed 1.

A monitor 600 is connected to the controller 500. The monitor 600 can display the log stored in the storage unit 510. In addition, the monitor 600 can display the phase pattern 9 to be displayed on the liquid crystal layer 216 by the spatial light modulator controller 502, and the intensity distribution image acquired by the profile acquisition camera 464.

Figure 19:
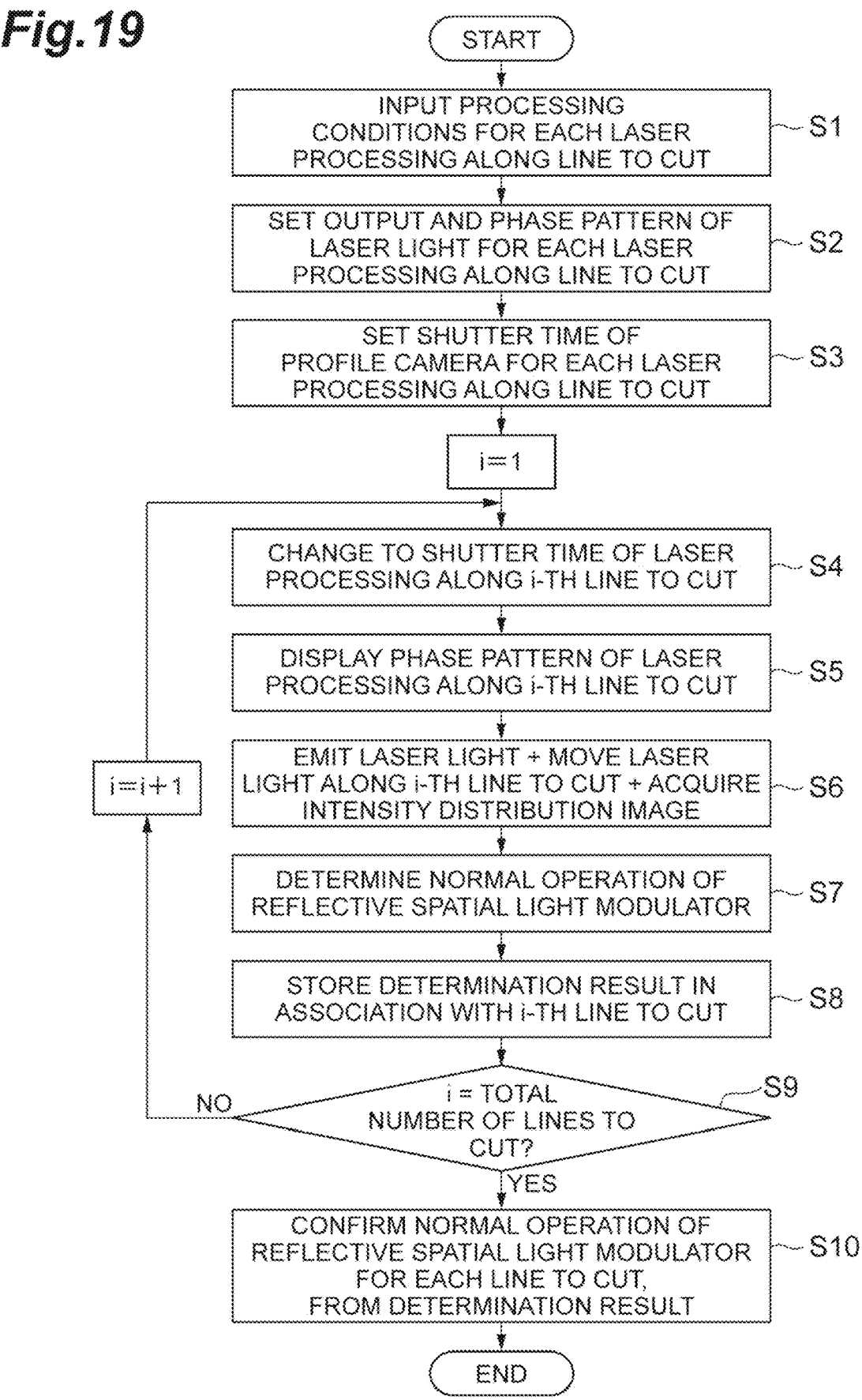
FIG. 19 is a flowchart illustrating a laser processing method by the laser processing device according to the first embodiment.

Next, a laser processing method (laser light irradiation method) by the laser processing device 200 will be described with reference to the flowchart of FIG. 19.

In the laser processing method according to the present embodiment, before processing operation that is operation of actually emitting the laser light L to the object to be processed 1, first, the processing conditions are input by the operator for each laser processing along the line to cut 5 (step S1). From the processing conditions input in step S1, the output of the laser light L is set by the laser light source controller 102 for each laser processing along the line to cut 5. At the same time, from the processing conditions input in step S1, the phase pattern 9 including the body pattern 9H and the marking 9M is set by the spatial light modulator controller 502 for each laser processing along the line to cut 5 (step S2). From the output of the laser light L set in step S2, the shutter time of the profile acquisition camera 464 is set by the camera controller 504 using the data table, for each laser processing along the line to cut 5 (step S3).

Subsequently, immediately before the processing operation, the shutter time of the profile acquisition camera 464 is changed by the camera controller 504 to the shutter time of laser processing along the i-th line to cut 5 that is the line to cut 5 to be cut in the i-th order (step S4). Note that, i is a count number for convenience, with an initial value of 1.

Subsequently, the phase pattern 9 of the laser processing along the i-th line to cut 5 is displayed on the liquid crystal layer 216 by the spatial light modulator controller 502 (step S5). The laser light L is generated from the laser oscillator 310 by the laser light source controller 102, and the laser light L is emitted to the object to be processed 1 with the output of the laser processing along the i-th line to cut 5. At the same time, the first moving mechanism 220 is driven by the controller 500 to relatively move the laser light L along the i-th line to cut 5. During the emission and movement of the laser light L along the i-th line to cut 5, the intensity distribution image is acquired by the profile acquisition camera 464 (step S6). The acquisition of the intensity distribution image is performed one time or multiple times at predetermined intervals during the emission and movement of the laser light L along one line to cut 5.

Image processing is performed by the camera controller 504 on the intensity distribution image acquired in step S6 described above, and the marking intensity image is acquired that is an image of the marking 9M on the intensity distribution image. The marking intensity image is compared by the determination unit 506 with the image of the marking 9M to be displayed on the liquid crystal layer 216. In a case where the two images coincide with each other, it is determined that operation of the reflective spatial light modulator 410 is normal. On the other hand, in a case where the two images do not coincide with each other, it is determined that the operation of the reflective spatial light modulator 410 is abnormal (step S7).

FIG. 17(b) is a diagram illustrating an example of an intensity distribution image 10 captured by the profile acquisition camera 464. The intensity distribution image 10 illustrated in FIG. 17(b) is an example in a case where the phase pattern 9 of FIG. 17(a) is displayed on the liquid crystal layer 216.

As illustrated in FIG. 17(b), in the intensity distribution image 10, an intensity image 1 OH corresponding to the body pattern 9H and a marking intensity image 10M corresponding to the marking 9M are displayed on a background image of a dark color region formed by shielding the laser light L by the slit member 424. The marking intensity image 10M is a staggered pattern coincident with the shape of the marking 9M (see FIG. 17(a)) displayed on the liquid crystal layer 216 (that is, the same pattern as the marking 9M), and includes a plurality of rectangular light color regions arranged. In this example, it can be determined that the marking intensity image 10M coincides with the marking 9M.

The determination result in step S7 is stored as a log in the storage unit 510 in association with the i-th line to cut 5 (step S8). Then, steps S4 to S8 are repeatedly performed for all the lines to cut 5 (repeated until i=the total number of lines to cut is reached) (step S9).

After the laser processing, the normal operation of the reflective spatial light modulator 410 is confirmed for each of the lines to cut 5 from the determination result stored in the storage unit 510 (step S10). After that, for example, in a case where there is a line to cut 5 for which the normal operation of the reflective spatial light modulator 410 cannot be confirmed, steps S4 to S8 described above are repeatedly performed for the line to cut.

Steps S1 to S3 described above constitute a step before the processing operation. Step S4 described above constitutes a step immediately before the processing operation. Steps S5 to S7 described above constitute a step during the processing. The step S9 constitutes a step after the processing. In addition, steps S5 and S6 described above correspond to the laser light irradiation control.

As described above, with the laser processing device 200 according to the present embodiment, the part, in the laser light L, not entering the entrance pupil plane 430a of the converging lens unit 430 (part to be cut by the converging lens unit 430) is modulated by the marking 9M to be displayed on the liquid crystal layer 216. Thus, while emitting the laser light L to the object to be processed 1, without affecting the laser light irradiation, it is possible to confirm whether or not display of the liquid crystal layer 216 is normally controlled, by confirming whether or not intensity modulation by the marking 9M appears in the intensity distribution image 10 acquired by the profile acquisition camera 464.

For example, in a case where the marking 9M to be displayed on the liquid crystal layer 216 coincides with the marking intensity image 10M, it is possible to confirm that the laser light L is normally modulated by the reflective spatial light modulator 410, and the reflective spatial light modulator 410 is operating normally. On the other hand, in a case where the marking 9M to be displayed on the liquid crystal layer 216 does not coincide with the marking intensity image 10M, it is possible to confirm that the liquid crystal layer 216 is in a frozen state (unresponsive state) and the display of the liquid crystal layer 216 is not properly switched, and the reflective spatial light modulator 410 is operating abnormally. Therefore, with the laser processing device 200, it is possible to accurately confirm the normal operation of the reflective spatial light modulator 410 during the emission of the laser light L.

In a case where the normal operation is confirmed by a drive circuit (driver) of the reflective spatial light modulator 410, since the drive circuit may normally operate even if the display of the liquid crystal layer 216 is abnormal, there is a possibility that detection of abnormal operation of the spatial light modulator 410 is delayed. In this regard, in the laser processing device 200, as described above, since whether or not the laser light L is modulated as intended by the marking 9M of the phase pattern 9 is monitored by the profile acquisition camera 464, it is possible to confirm the normal operation of the reflective spatial light modulator 410 without delay. It is possible to confirm the normal operation of the reflective spatial light modulator 410 during the laser processing operation without additional operation.

In the laser processing device 200, the marking 9M is located in the markable region B from which the part of the laser light L not entering the entrance pupil plane 430a of the converging lens unit 430 is emitted, in the region HA on which the laser light L strikes in the liquid crystal layer 216. By locating the marking 9M in this way, it is possible to specifically implement modulation of the part of the laser light L not entering the entrance pupil plane 430a of the converging lens unit 430.

In the laser processing device 200, the camera controller 504 varies the shutter time of the profile acquisition camera 464 in accordance with the magnitude of the output of the laser light L generated by the laser oscillator 310. Since the amount of light on the profile acquisition camera 464 changes depending on the output of the laser light L, by varying the shutter time in accordance with the magnitude of the output of the laser light L, it is possible to keep a constant level of the luminance value of the intensity distribution image 10 to be acquired and secure the quality of the intensity distribution image 10.

The laser processing device 200 includes the determination unit 506. The determination unit 506 determines whether or not the reflective spatial light modulator 410 has normally operated, from the marking 9M to be displayed on the liquid crystal layer 216 by the spatial light modulator controller 52 and the marking intensity image of the intensity distribution image 10. With this configuration, it is possible to confirm the normal operation of the reflective spatial light modulator 410 from the determination result of the determination unit 506.

In the laser processing device 200, the lens 422 is arranged, and the slit member 424 is arranged at the focal position of the lens 422 or near the focal position. Since the slit member 424 shields the spatial frequency component of greater than or equal to the constant value in the laser light L, it is possible to inhibit that the spatial frequency component of greater than or equal to the constant value enters the profile acquisition camera 464. As a result, it is possible to inhibit that visibility (recognition) of the intensity modulation by the marking 9M is degraded due to the spatial frequency component of greater than or equal to the constant value, in the intensity distribution image 10 acquired. Such a slit member 424 constitutes a mechanism configured to convert the phase pattern 9 into an intensity distribution.

The laser processing device 200 includes the first moving mechanism 220 configured to relatively move the laser light L with respect to the processing object to be processed 1 along the line to cut 5. In the laser light source controller 102, the output of the laser light L is set for each laser processing along the line to cut 5. In the spatial light modulator controller 502, the phase pattern 9 including the body pattern 9H and the marking 9M corresponding to the body pattern 9H is set for each laser processing along the line to cut 5. Then, the controller 500 executes the laser light irradiation control in which while the phase pattern 9 set is displayed on the liquid crystal layer 216, the laser light L is emitted to the object to be processed 1 generated from the laser oscillator 310 with the output set, and the laser light L is relatively moved by the first moving mechanism 220 along each of the plurality of lines to cut 5. During execution of the laser light irradiation control, the profile acquisition camera 464 acquires the intensity distribution image. With such a configuration, it is possible to specifically implement accurate confirmation of the normal operation of the reflective spatial light modulator 410 during the emission of the laser light L.

In the laser processing device 200, the marking 9M is a pattern including at least one of the phase region of the spatial frequency component of greater than or equal to the constant value or the phase region of the spatial frequency component of less than the constant value. Thus, the intensity modulation by the marking 9M can be easily recognized in the intensity distribution image acquired by the profile acquisition camera 464.

In the laser processing device 200, the modified region 7 is formed within the object to be processed 1 by setting the converging point P within the object to be processed 1 and emitting the laser light L to the object to be processed 1. In this case, laser processing within the object to be processed 1 can be performed.

In the present embodiment, an aspect of the marking 9M is not particularly limited, and various sizes, shapes, and patterns may be used as long as it is possible to determine coincidence with the corresponding marking intensity image 10M. For example, in another example illustrated in FIG. 20(a), the marking 9M is a cross-shaped dark color region arranged on a background image of a grating pattern. As illustrated in FIG. 20(b), the marking intensity image 10M coincident with the marking 9M is a cross-shaped light color region coincident with the shape of the marking 9M.

For example, in another example illustrated in FIG. 21(a), the marking 9M is a dark color region of a shape formed by cutting out three corner portions of a square frame shape arranged on a background image of a grating pattern. As illustrated in FIG. 21(b), the marking intensity image 10M coincident with the marking 9M is a light color region of a shape formed by cutting out three corner portions of a square frame shape coincident with the shape of the marking 9M.

Figure 22:
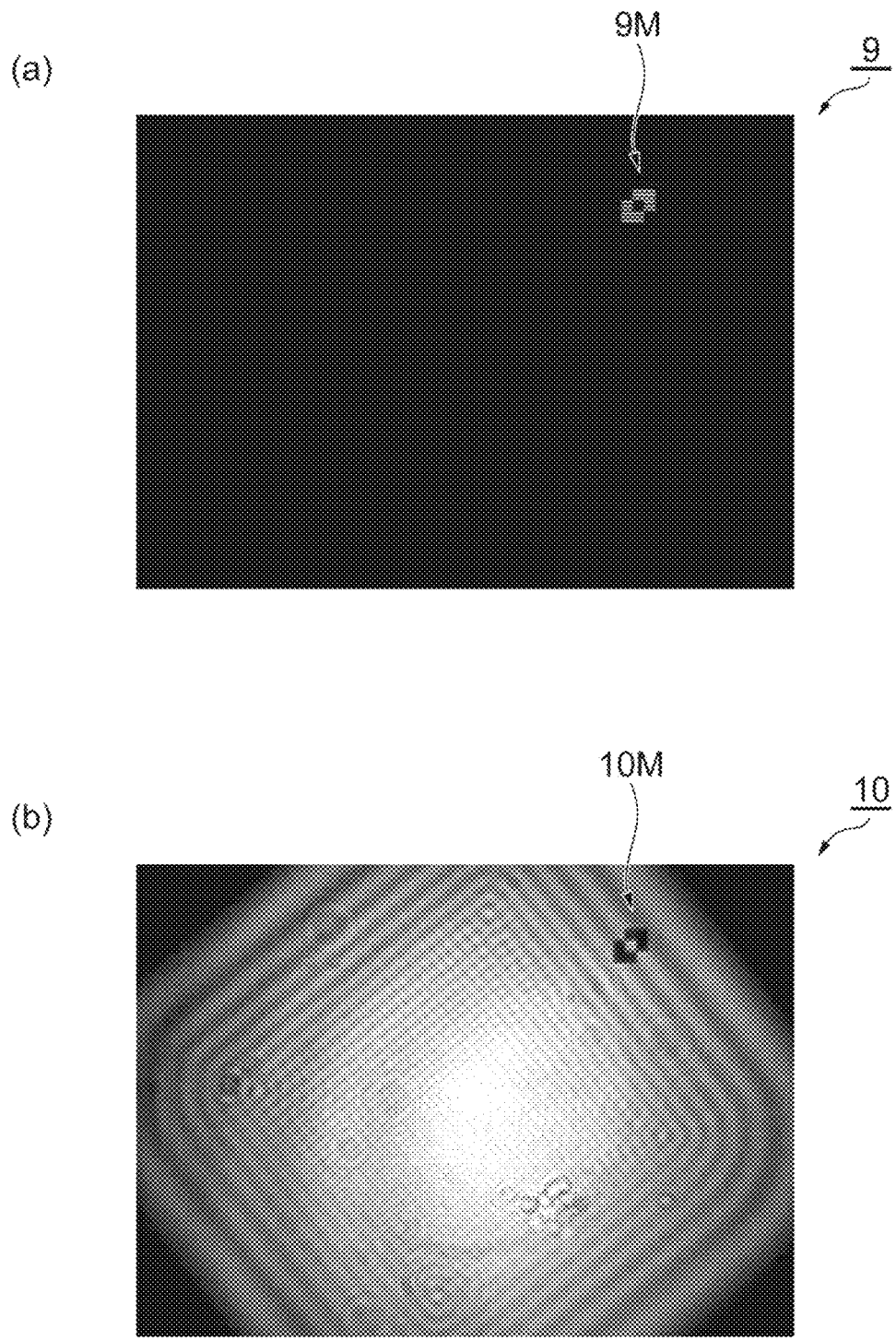
FIG. 22($a$) is a diagram illustrating another example of the phase pattern displayed on the liquid crystal layer.

For example, in another example illustrated in FIG. 22(a), the marking 9M is a grating region of a shape formed by cutting out two opposed corner portions of a square frame shape arranged on a dark color image. As illustrated in FIG. 22(b), the marking intensity image 10M coincident with the marking 9M is a dark color region of a shape formed by cutting out two opposed corner portions of a square frame shape coincident with the shape of the marking 9M.

Figure 23:
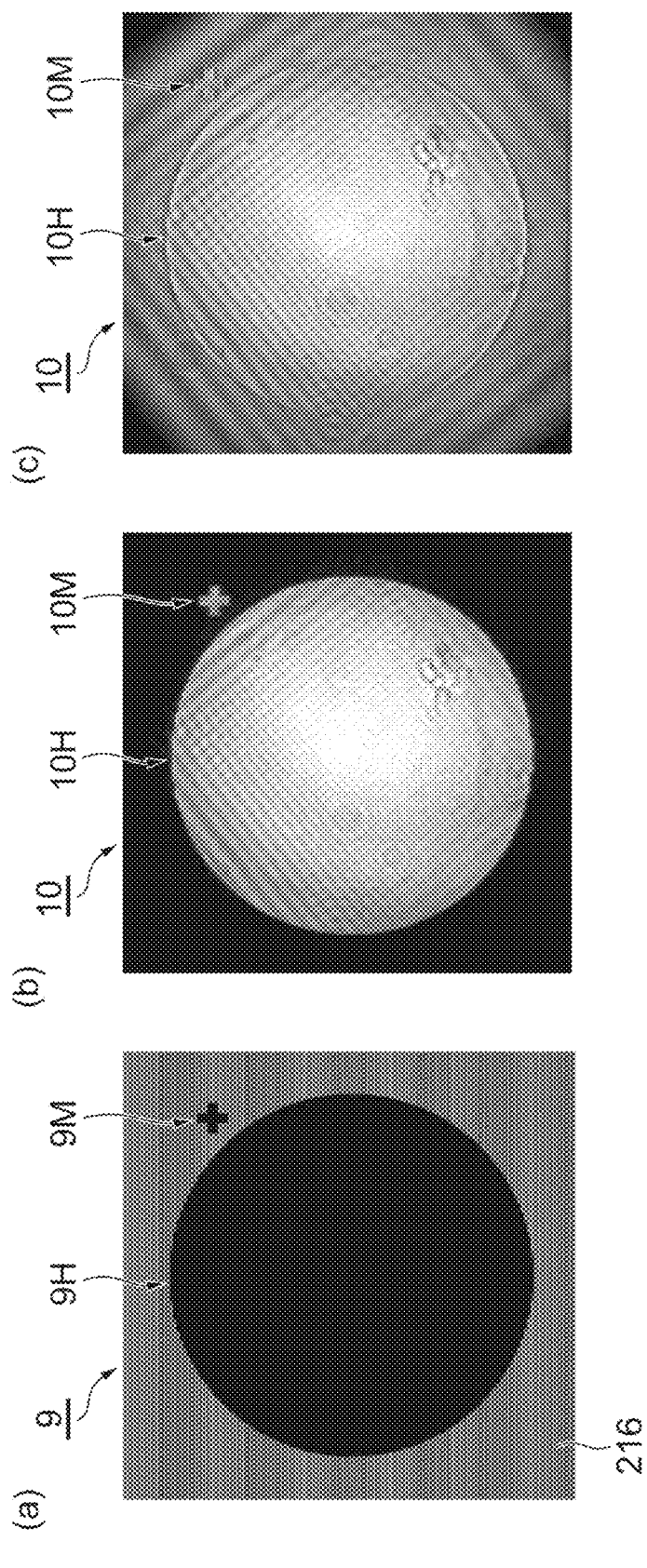
FIG. 23 is a diagram illustrating a verification result verifying an effect of a slit member.

FIG. 23 is a diagram illustrating a verification result verifying an effect of the slit member 424. FIG. 23(a) illustrates the phase pattern 9 used for the verification. FIG. 23(b) illustrates the intensity distribution image 10 acquired when the phase pattern 9 of FIG. 23(a) is displayed on the liquid crystal layer 216 in the laser processing device 200 including the slit member 424. FIG. 23(c) illustrates the intensity distribution image 10 acquired when the phase pattern 9 of FIG. 23(a) is displayed on the liquid crystal layer 216 in the laser processing device 200 not including the slit member 424.

As illustrated in FIG. 23(c), it can be seen that even in a case where the slit member 424 is not included, the marking intensity image 10M can be identified and the normal operation of the reflective spatial light modulator 410 can be determined from the marking 9M and the marking intensity image 10M. In addition, it can be seen that in a case where the slit member 424 is included, the visibility of the marking intensity image 10M is improved and the normal operation of the reflective spatial light modulator 410 can be more accurately determined from the marking 9M and the marking intensity image 10M.

Figure 24:
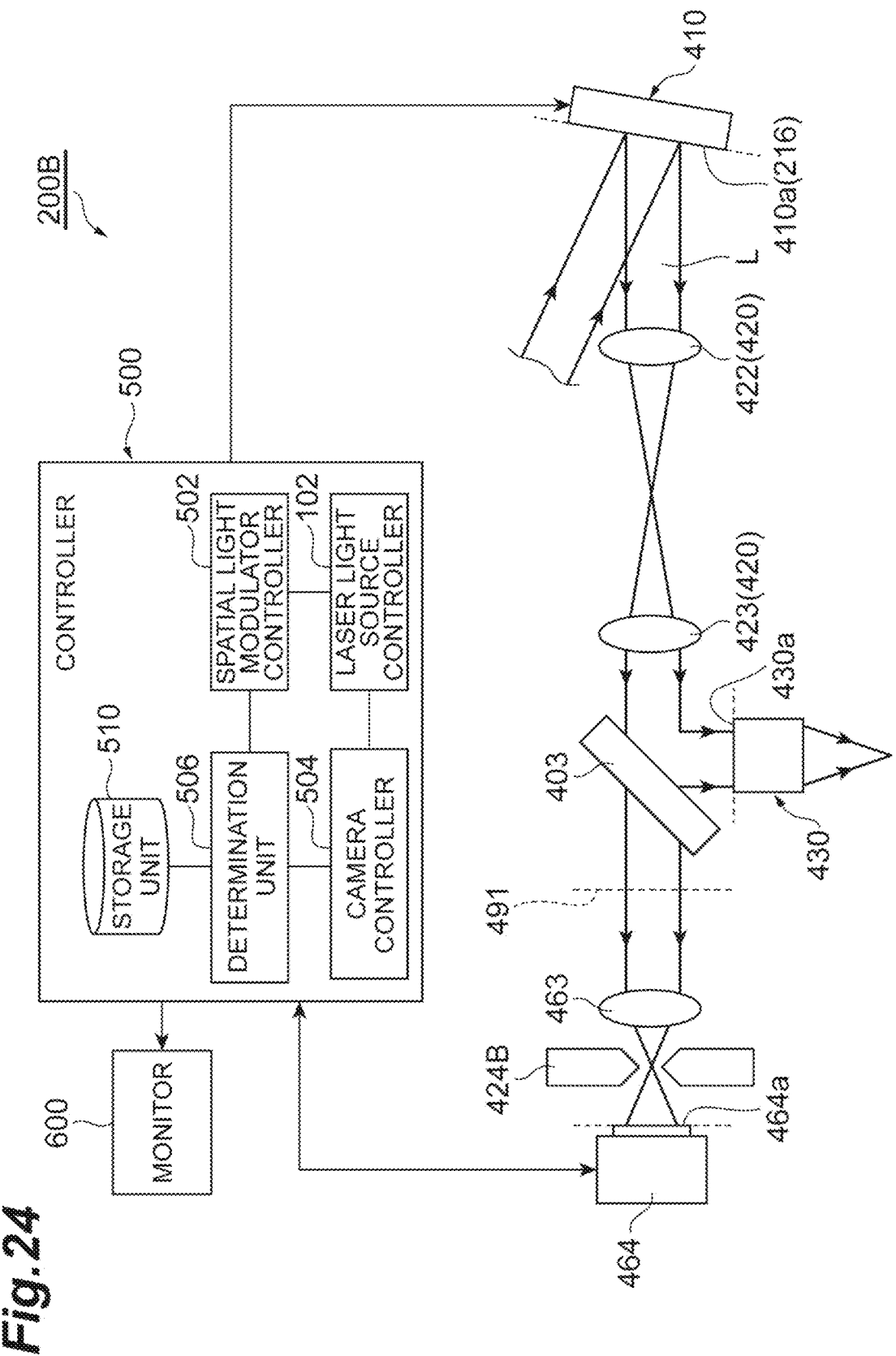
FIG. 24 is a schematic configuration diagram illustrating a main part of a laser processing device according to a second embodiment.

Next, a second embodiment will be described. FIG. 24 is a schematic configuration diagram illustrating a main part of a laser processing device 200B according to the second embodiment. As illustrated in FIG. 24, the laser processing device 200B of the present embodiment is different from the laser processing device 200 (see FIG. 17) in that a slit member 424B is arranged at the focal position of the lens 463 that is a focusing lens in the optical path of the laser light L. The slit member 424B is configured similarly to the slit member 424. The slit member 424B may be arranged near the focal position of the lens 463.

As described above, also in the laser processing device 200B, the above-described function and effect are achieved that it is possible to accurately confirm the normal operation of the reflective spatial light modulator 410 during the emission of the laser light L.

Figure 25:
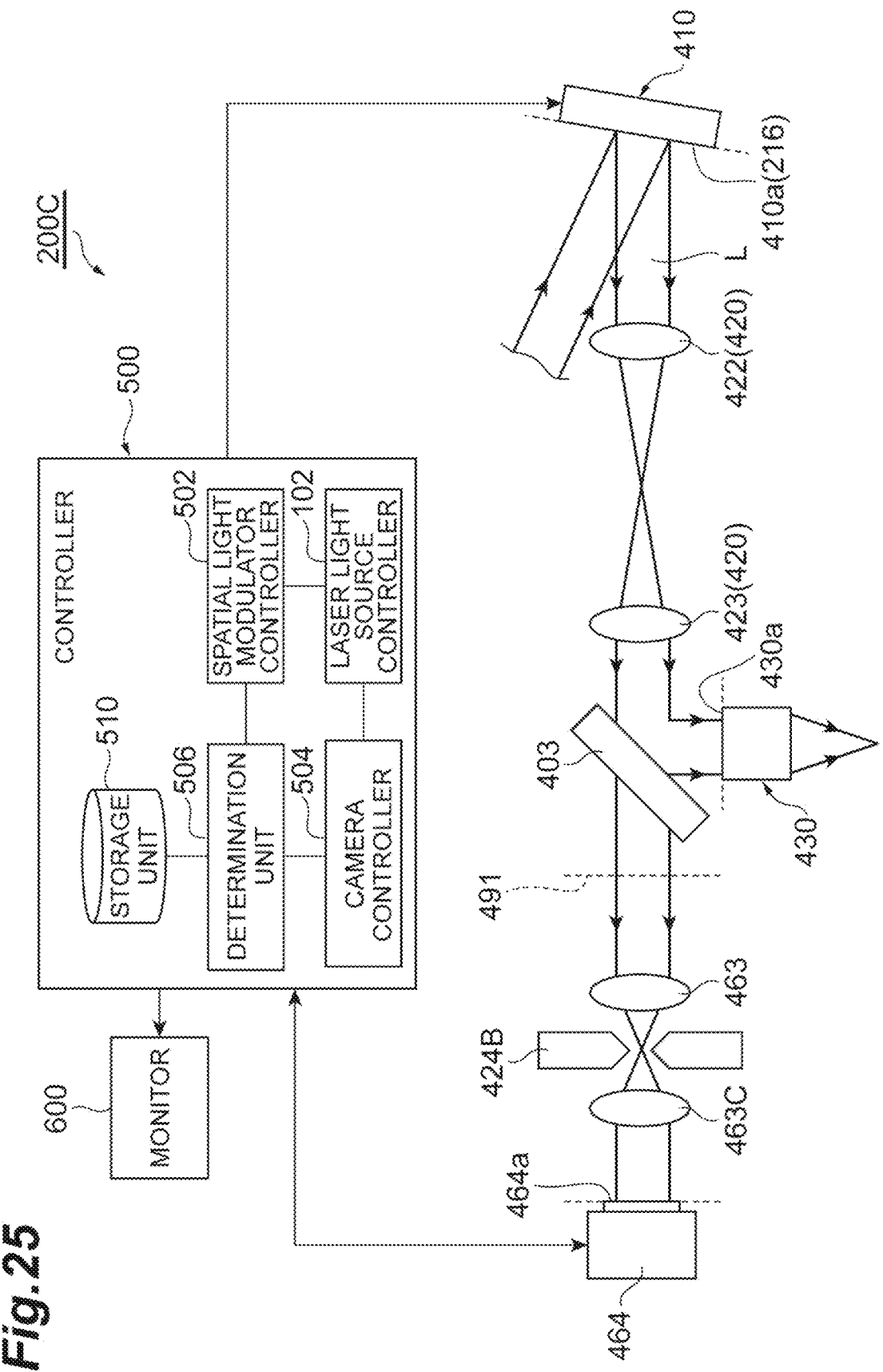
FIG. 25 is a schematic configuration diagram illustrating a main part of a laser processing device according to a modification of the second embodiment.

FIG. 25 is a schematic configuration diagram illustrating a main part of a laser processing device 200C according to a modification of the second embodiment. As illustrated in FIG. 25, as the modification according to the second embodiment, the laser processing device 200C can be employed including a lens 463C between the lens 463 and the profile acquisition camera 464 in the optical path of the laser light L. The lens 463C collimates the laser light L focused by the lens 463 and allows the collimated laser light L to enter the profile acquisition camera 464. The lens 463C constitutes a relay lens. The lenses 463 and 463C relay (image) the wavefront of the laser light L (real image in the liquid crystal layer 216) relayed to the conjugate plane 491, to the imaging surface 464a of the profile acquisition camera 464.

In the above, the embodiments have been described; however, the present invention is not limited to the above-described embodiments, and may be modified within the range not changing the gist described in each claim or applied to other things.

The above-described embodiments each are not limited to one configured to form the modified region 7 within the object to be processed 1, and may be one configured to perform other laser processing such as ablation. The above-described embodiments each are not limited to a laser processing device used for laser processing of converging the laser light L within the processing object to be processed 1, and may be a laser processing device used for laser processing of converging the laser light L at the front surface 1a, 3 or the back surface 1b of the processing object to be processed 1. The device to which the present invention is applied is not limited to the laser processing device, and the present invention can be applied to various laser light irradiation device as long as the device emits the laser light L to the object. In the above-described embodiments, the line to cut 5 is set as an irradiation schedule line; however, the irradiation schedule line is not limited to the line to cut 5, and may be any line as long as it is a line along which the emitted laser light L is moved.

In the above-described embodiments, the imaging optical system constituting the double telecentric optical system in which the reflective surface 410a of the reflective spatial light modulator 410 and the entrance pupil plane 430a of the converging lens unit 430 are in the imaging relationship, is not limited to the pair of lenses 422 and 423, and may be one including a first lens system (for example, a doublet, three or more lenses, or the like) on the reflective spatial light modulator 410 side, and a second lens system (for example, a doublet, three or more lenses, or the like) on the converging lens unit 430 side, or the like.

In the above-described embodiments, for the profile acquisition camera 464, it is sufficient that its imaging surface 464a is located on a plane conjugate with the reflective surface of the liquid crystal layer 216 of the reflective spatial light modulator 410, and the profile acquisition camera 464 may be arranged at a position of the conjugate plane 491. In this case, in the laser processing device 200 (see FIG. 17), the lens 463 is unnecessary. In the above-described embodiments, the relay magnification of each of the lens 422, the lens 423, and the lens 463 may be an arbitrary magnification. The above-described embodiments each include the reflective spatial light modulator 410; however, the spatial light modulator is not limited to a reflective spatial light modulator, and a transmissive spatial light modulator may be included.

The converging lens unit 430 and the pair of distance measuring sensors 450 are attached to the end 401d of the housing 401 in the Y-axis direction; however, the converging lens unit 430 and the pair of distance measuring sensors 450 only need to be attached at a side closer to the end 401d from the center position of the housing 401 in the Y-axis direction. The reflective spatial light modulator 410 is attached to the end 401c of the housing 401 in the Y-axis direction; however, the reflective spatial light modulator 410 only needs to be attached at a side closer to the end 401c from the center position of the housing 401 in the Y-axis direction. In addition, the distance measuring sensors 450 may be arranged only on one side of the converging lens unit 430 in the X-axis direction.

In the above-described embodiments, a case has been described as an example where one row of the modified region 7 is formed in the object to be processed 1 along one line to cut 5 (in the case of performing one scan for one line); however, a plurality of rows of the modified regions 7 may be formed along one line to cut 5 (multiple scans for one line). In this case, steps S1 to S3 described above are also performed for each laser processing of the plurality of rows of modified regions 7, and steps S4 to S8 described above are repeatedly performed for the plurality of rows.

In the above-described embodiments, the coincidence of the marking 9M and the marking intensity image 10M is determined by the determination unit 506; however, the phase pattern 9 to be displayed on the liquid crystal layer 216 and the intensity distribution image 10 acquired by the profile acquisition camera 464 may be displayed on the monitor 600, and the operator may visually determine the correspondence of the marking 9M and the marking intensity image 10M. The above-described embodiments each include the λ/2 wave plate unit 330 and the polarizing plate unit 340 in the laser output unit 300, as an output adjusting unit configured to adjust the output (light intensity) of the laser light L; however, another output adjusting unit may be included separate from the laser output unit 300. In any of these cases, the output of the laser light L can be controlled by the controller 500.

In the above-described embodiments, the profile acquisition camera 464 is used as the intensity distribution acquisition unit, and the intensity distribution of the laser light L is recognized by the intensity distribution image 10 acquired; however, instead of the profile acquisition camera 464, another device or apparatus may be used enabled to acquire the intensity distribution of the laser light L. In the above-described embodiments, instead of the dichroic mirror 403, a beam splitter may be used configured to split the laser light L into a profile acquisition camera 464 side and a converging lens unit 430 side.

REFERENCE SIGNS LIST

1 object to be processed (object)
5, 5*a*, 5*b* line to cut (irradiation schedule line)
7 modified region
9 phase pattern
9H body pattern
9M marking
10 intensity distribution image (intensity distribution)
100, 200, 200B, 200C laser processing device (laser light irradiation device)
102 laser light source controller (controller)
216 liquid crystal layer (display unit)
220 first moving mechanism (moving mechanism)
241*a* first lens
310 laser oscillator (laser light source)
410 reflective spatial light modulator (spatial light modulator)
422 lens (focusing lens)
424, 424B slit member
430 converging lens unit (objective lens)
430*a* entrance pupil plane (pupil plane)
463 lens (focusing lens)
464 profile acquisition camera (intensity distribution acquisition unit)
500 controller
502 spatial light modulator controller (controller)
504 camera controller (controller)
506 determination unit
L laser light

The invention claimed is:

1. A laser light irradiation device configured to emit laser light to an object, the laser light irradiation device comprising:
a laser light source configured to generate the laser light;
a spatial light modulator including a display unit configured to display a phase pattern, the spatial light modulator allowing the laser light generated by the laser light source to enter the display unit and modulating the laser light in accordance with the phase pattern to emit the laser light from the display unit;
a controller configured to control at least the phase pattern to be displayed on the display unit;
an objective lens configured to converge the laser light emitted from the spatial light modulator at the object; and
an intensity distribution acquisition unit configured to acquire an intensity distribution of the laser light emitted from the spatial light modulator and entering the objective lens, wherein
the controller displays, on the display unit, the phase pattern including a marking configured to modulate part, in the laser light, not entering a pupil plane of the objective lens.

2. The laser light irradiation device according to claim 1, wherein the marking is located in a region from which the part of the laser light not entering the pupil plane of the objective lens is emitted, in a region on which the laser light strikes in the display unit.

3. The laser light irradiation device according to claim 1, wherein the intensity distribution acquisition unit is a camera configured to acquire an image of the intensity distribution of the laser light.

4. The laser light irradiation device according to claim 3, wherein the controller varies shutter time of the intensity distribution acquisition unit in accordance with magnitude of an output of the laser light generated by the laser light source.

5. The laser light irradiation device according to claim 1, further comprising a determination unit configured to determine whether or not the spatial light modulator has normally operated on the basis of the marking to be displayed on the display unit by the controller and the intensity distribution acquired by the intensity distribution acquisition unit.

6. The laser light irradiation device according to claim 1, wherein
a focusing lens configured to focus the laser light is arranged between the spatial light modulator and the intensity distribution acquisition unit in an optical path of the laser light, and
a slit member configured to shield a spatial frequency component of greater than or equal to a constant value in the laser light is arranged at a focal position of the focusing lens or near the focal position.

7. The laser light irradiation device according to claim 1, wherein
the laser light irradiation device is configured to emit the laser light to the object along a plurality of irradiation schedule lines, and
includes a moving mechanism configured to relatively move the laser light along the irradiation schedule lines with respect to the object, and
in the controller, the output of the laser, light and the phase pattern including a body pattern and the marking corresponding to the body pattern are set for each laser light irradiation does along one or the plurality of irradiation schedule lines,
the controller
executes laser light irradiation control in which while the phase pattern set is displayed on the display unit, the laser light is emitted to the object with the output set, and the laser light is relatively moved by the moving mechanism along each of the plurality of irradiation schedule lines, and
the intensity distribution acquisition unit
acquires the intensity distribution of the laser light during execution of the laser light irradiation control by the controller.

8. The laser light irradiation device according to claim 1, wherein the marking is a pattern including at least one of a phase region of a spatial frequency component of greater than or equal to a constant value and a phase region of a spatial frequency component of less than the constant value.

9. The laser light irradiation device according to claim 1, wherein a modified region is formed within the object, by setting a converging point within the object and emitting the laser light to the object.

10. The laser light irradiation device according to claim 2, further comprising a determination unit configured to determine whether or not the spatial light modulator has normally operated on the basis of the marking to be displayed on the display unit by the controller and the intensity distribution acquired by the intensity distribution acquisition unit.

11. The laser light irradiation device according to claim 3, further comprising a determination unit configured to determine whether or not the spatial light modulator has normally operated on the basis of the marking to be displayed on the display unit by the controller and the intensity distribution acquired by the intensity distribution acquisition unit.

12. The laser light irradiation device according to claim 4, further comprising a determination unit configured to determine whether or not the spatial light modulator has normally operated on the basis of the marking to be displayed on the display unit by the controller and the intensity distribution acquired by the intensity distribution acquisition unit.

13. The laser light irradiation device according to claim 2, wherein
a focusing lens configured to focus the laser light is arranged between the spatial light modulator and the intensity distribution acquisition unit in an optical path of the laser light, and
a slit member configured to shield a spatial frequency component of greater than or equal to a constant value in the laser light is arranged at a focal position of the focusing lens or near the focal position.

14. The laser light irradiation device according to claim 3, wherein
a focusing lens configured to focus the laser light is arranged between the spatial light modulator and the intensity distribution acquisition unit in an optical path of the laser light, and
a slit member configured to shield a spatial frequency component of greater than or equal to a constant value in the laser light is arranged at a focal position of the focusing lens or near the focal position.

15. The laser light irradiation device according to claim 4, wherein
a focusing lens configured to focus the laser light is arranged between the spatial light modulator and the intensity distribution acquisition unit in an optical path of the laser light, and
a slit member configured to shield a spatial frequency component of greater than or equal to a constant value in the laser light is arranged at a focal position of the focusing lens or near the focal position.

16. The laser light irradiation device according to claim 5, wherein
a focusing lens configured to focus the laser light is arranged between the spatial light modulator and the intensity distribution acquisition unit in an optical path of the laser light, and
a slit member configured to shield a spatial frequency component of greater than or equal to a constant value in the laser light is arranged at a focal position of the focusing lens or near the focal position.

17. The laser light irradiation device according to claim 2, wherein
the laser light irradiation device is configured to emit the laser light to the object along a plurality of irradiation schedule lines, and
includes a moving mechanism configured to relatively move the laser light along the irradiation schedule lines with respect to the object, and
in the controller, the output of the laser light and the phase pattern including a body pattern and the marking corresponding to the body pattern are set for each laser light irradiation does along one or the plurality of irradiation schedule lines,
the controller
executes laser light irradiation control in which while the phase pattern set is displayed on the display unit, the laser light is emitted to the object with the output set, and the laser light is relatively moved by the moving mechanism along each of the plurality of irradiation schedule lines, and
the intensity distribution acquisition unit
acquires the intensity distribution of the laser light during execution of the laser light irradiation control by the controller.

18. The laser light irradiation device according to claim 3, wherein
the laser light irradiation device is configured to emit the laser light to the object along a plurality of irradiation schedule lines, and
includes a moving mechanism configured to relatively move the laser light along the irradiation schedule lines with respect to the object, and
in the controller, the output of the laser light and the phase pattern including a body pattern and the marking corresponding to the body pattern are set for each laser light irradiation does along one or the plurality of irradiation schedule lines,
the controller
executes laser light irradiation control in which while the phase pattern set is displayed on the display unit, the laser light is emitted to the object with the output set, and the laser light is relatively moved by the moving mechanism along each of the plurality of irradiation schedule lines, and
the intensity distribution acquisition unit
acquires the intensity distribution of the laser light during execution of the laser light irradiation control by the controller.

19. The laser light irradiation device according to claim 4, wherein
the laser light irradiation device is configured to emit the laser light to the object along a plurality of irradiation schedule lines, and
includes a moving mechanism configured to relatively move the laser light along the irradiation schedule lines with respect to the object, and
in the controller, the output of the laser light and the phase pattern including a body pattern and the marking corresponding to the body pattern are set for each laser light irradiation does along one or the plurality of irradiation schedule lines,
the controller
executes laser light irradiation control in which while the phase pattern set is displayed on the display unit, the laser light is emitted to the object with the output set, and the laser light is relatively moved by the moving mechanism along each of the plurality of irradiation schedule lines, and
the intensity distribution acquisition unit
acquires the intensity distribution of the laser light during execution of the laser light irradiation control by the controller.

* * * * *